United States Patent
Gadre et al.

(10) Patent No.: US 10,529,009 B2
(45) Date of Patent: Jan. 7, 2020

(54) DIGITAL AVATARS IN ONLINE MARKETPLACES

(71) Applicant: eBay Inc., San Jose, CA (US)

(72) Inventors: Akshay Gadre, North Wales, PA (US); Kerri Breslin, Woodland Hills, CA (US)

(73) Assignee: eBay Inc., San Jose, CA (US)

( * ) Notice: Subject to any disclaimer, the term of this patent is extended or adjusted under 35 U.S.C. 154(b) by 647 days.

(21) Appl. No.: 14/315,230

(22) Filed: Jun. 25, 2014

(65) Prior Publication Data
US 2015/0379623 A1   Dec. 31, 2015

(51) Int. Cl.
G06Q 30/00 (2012.01)
G06Q 30/06 (2012.01)
G06Q 50/00 (2012.01)

(52) U.S. Cl.
CPC ..... *G06Q 30/0643* (2013.01); *G06Q 30/0623* (2013.01); *G06Q 30/0641* (2013.01); *G06Q 50/01* (2013.01)

(58) Field of Classification Search
CPC ............... G06Q 30/0643; G06Q 50/01; G06Q 30/0601–0645; G06Q 30/0623; G06Q 30/0641
USPC ................................. 705/26.1–27.2
See application file for complete search history.

(56) References Cited

U.S. PATENT DOCUMENTS 5,930,769 A * 7/1999 Rose ............... G06Q 30/06
                                                  345/419

5,937,081 A   8/1999 O'brill et al.
6,546,309 B1  4/2003 Gazzuolo
(Continued)

FOREIGN PATENT DOCUMENTS

WO   WO-2015200617 A1   12/2015
WO   WO-2016019033 A2    2/2016
(Continued)

OTHER PUBLICATIONS

"On generating realistic avatars: dress in your own style," by Hui Yu, Shenfeng Qin, Guangmin Sun, and David K. Wright, Multimedia Tools and Applications, vol. 59, Iss. 3, (Aug. 2012): 973-990. DOI:10.1007/s11042-011-0781-6 (Year: 2012).*

(Continued)

*Primary Examiner* — Anne M Georgalas
(74) *Attorney, Agent, or Firm* — Schwegman Lundberg & Woessner, P.A.

(57) ABSTRACT

A system comprising a computer-readable storage medium storing at least one program, and a computer-implemented method for providing digital avatars. A first request message is received for requesting a digital representation of a first target user combined with a target product for an online marketplace application on a first client device. The first request message is associated with a first user identifier indicative and a product identifier. Based on the first user identifier, a first user record is selected from a first database. The first user record includes measurement data. Based on the product identifier, a product record is selected from a second database. Based at least on the measurement data of the first user record and the selected product record, model data of the target product is determined and provided to the first client device.

20 Claims, 21 Drawing Sheets

(56) References Cited

U.S. PATENT DOCUMENTS

| | | | |
|---|---|---|---|
| 6,901,379 B1* | 5/2005 | Balter | G06Q 30/06 |
| | | | 434/395 |
| 6,968,075 B1 | 11/2005 | Chang | |
| 7,062,454 B1 | 6/2006 | Giannini et al. | |
| 7,133,839 B2 | 11/2006 | Inoue et al. | |
| 7,194,327 B2 | 3/2007 | Lam | |
| 7,328,177 B1* | 2/2008 | Lin-Hendel | G06F 17/30867 |
| | | | 705/26.61 |
| 7,617,016 B2 | 11/2009 | Wannier et al. | |
| 8,256,664 B1 | 9/2012 | Balfanz et al. | |
| 8,401,914 B1 | 3/2013 | Kim | |
| 8,437,871 B2 | 5/2013 | Ko | |
| 8,660,902 B2 | 2/2014 | Coulter | |
| 8,655,053 B1 | 3/2014 | Hansen | |
| 8,700,392 B1 | 4/2014 | Hart et al. | |
| 8,818,883 B2 | 8/2014 | Lawrence et al. | |
| 8,982,109 B2 | 3/2015 | Vilcovsky et al. | |
| 9,064,184 B2* | 6/2015 | Ruan | G06K 9/62 |
| 9,412,192 B2* | 8/2016 | Mandel | G06T 13/80 |
| 9,418,378 B2 | 8/2016 | Staicut et al. | |
| 9,589,535 B2* | 3/2017 | Poon | A63F 13/655 |
| 9,607,419 B2 | 3/2017 | Kim et al. | |
| 9,724,600 B2* | 8/2017 | Willoughby | A63F 13/10 |
| 9,799,064 B2 | 10/2017 | Ohnemus et al. | |
| 9,898,742 B2 | 2/2018 | Higgins et al. | |
| 10,311,508 B2* | 6/2019 | Reed | G06F 17/5009 |
| 10,332,176 B2 | 6/2019 | Gadre et al. | |
| 2002/0045959 A1 | 4/2002 | Van Overveld | |
| 2002/0178061 A1 | 11/2002 | Lam | |
| 2005/0086126 A1 | 4/2005 | Patterson | |
| 2005/0246278 A1 | 11/2005 | Gerber et al. | |
| 2005/0275638 A1 | 12/2005 | Kolmykov-Zotov et al. | |
| 2006/0184993 A1 | 8/2006 | Goldthwaite et al. | |
| 2007/0198120 A1* | 8/2007 | Wannier | A41H 3/007 |
| | | | 700/138 |
| 2008/0004116 A1 | 1/2008 | Van Luchene et al. | |
| 2008/0262944 A1 | 10/2008 | Wu | |
| 2009/0018926 A1 | 1/2009 | Buehlman | |
| 2009/0019053 A1 | 1/2009 | Burgess et al. | |
| 2009/0115777 A1 | 5/2009 | Reyers Moreno | |
| 2009/0167719 A1 | 7/2009 | Woolley | |
| 2010/0030578 A1* | 2/2010 | Siddique | G06Q 10/0637 |
| | | | 705/3 |
| 2010/0034462 A1 | 2/2010 | Nevatia et al. | |
| 2010/0191770 A1* | 7/2010 | Cho | G06Q 30/02 |
| | | | 707/783 |
| 2010/0217685 A1 | 8/2010 | Melcher et al. | |
| 2010/0245555 A1 | 9/2010 | Talluri et al. | |
| 2010/0269054 A1 | 10/2010 | Goldberg et al. | |
| 2010/0306082 A1 | 12/2010 | Wolper et al. | |
| 2011/0022965 A1 | 1/2011 | Lawrence et al. | |
| 2011/0246329 A1 | 10/2011 | Geisner et al. | |
| 2012/0022978 A1 | 1/2012 | Manea et al. | |
| 2012/0086783 A1* | 4/2012 | Sareen | G06N 3/006 |
| | | | 348/47 |
| 2012/0137259 A1 | 5/2012 | Campbell et al. | |
| 2012/0162218 A1* | 6/2012 | Kim | G06T 13/40 |
| | | | 345/419 |
| 2012/0239513 A1 | 9/2012 | Oliver et al. | |
| 2012/0257035 A1 | 10/2012 | Larsen | |
| 2012/0264510 A1 | 10/2012 | Wigdor et al. | |
| 2012/0299912 A1 | 11/2012 | Kapur et al. | |
| 2013/0030915 A1 | 1/2013 | Statler et al. | |
| 2013/0110679 A1 | 5/2013 | Spadafora et al. | |
| 2013/0166407 A1 | 6/2013 | Sullaj | |
| 2013/0179288 A1 | 7/2013 | Moses et al. | |
| 2013/0185679 A1 | 7/2013 | Fretwell et al. | |
| 2013/0215116 A1 | 8/2013 | Siddique et al. | |
| 2013/0254066 A1 | 9/2013 | Amacker et al. | |
| 2013/0304578 A1 | 11/2013 | Kannan et al. | |
| 2013/0315475 A1 | 11/2013 | Song et al. | |
| 2014/0035913 A1 | 2/2014 | Higgins et al. | |
| 2014/0040041 A1 | 2/2014 | Ohnemus et al. | |
| 2014/0052567 A1 | 2/2014 | Bhardwaj et al. | |
| 2014/0115059 A1 | 4/2014 | Van Wie et al. | |
| 2014/0132635 A1* | 5/2014 | Murdoch | G01B 21/28 |
| | | | 345/641 |
| 2014/0168217 A1 | 6/2014 | Kim et al. | |
| 2014/0176565 A1 | 6/2014 | Adeyoola et al. | |
| 2014/0180873 A1 | 6/2014 | Rijhwani | |
| 2014/0225978 A1 | 8/2014 | Saban et al. | |
| 2014/0279192 A1 | 9/2014 | Selby | |
| 2014/0285522 A1 | 9/2014 | Kim et al. | |
| 2014/0330670 A1 | 11/2014 | Ainsworth, III et al. | |
| 2014/0358738 A1 | 12/2014 | Ohnemus et al. | |
| 2014/0368499 A1 | 12/2014 | Kaur | |
| 2015/0058083 A1 | 2/2015 | Herrero | |
| 2015/0154453 A1 | 6/2015 | Wilf | |
| 2015/0154691 A1* | 6/2015 | Curry | G06Q 30/0643 |
| | | | 705/27.2 |
| 2015/0279098 A1 | 10/2015 | Kim et al. | |
| 2015/0324103 A1 | 11/2015 | Tepmongkol et al. | |
| 2016/0035061 A1 | 2/2016 | Gadre et al. | |
| 2016/0042402 A1 | 2/2016 | Gadre et al. | |
| 2016/0063588 A1 | 3/2016 | Gadre et al. | |
| 2016/0063613 A1 | 3/2016 | Zhao et al. | |
| 2016/0071321 A1 | 3/2016 | Nishiyama et al. | |
| 2016/0088284 A1 | 3/2016 | Sareen et al. | |
| 2016/0110595 A1 | 4/2016 | Wang et al. | |
| 2018/0137515 A1 | 5/2018 | Higgins et al. | |

FOREIGN PATENT DOCUMENTS

| | | |
|---|---|---|
| WO | WO-2016019033 A3 | 2/2016 |
| WO | WO-2016022937 A1 | 2/2016 |

OTHER PUBLICATIONS

"International Application Serial No. PCT/US2015/042683, International Search Report dated Mar. 29, 2016", 2 pgs.

"International Application Serial No. PCT/US2015/042683, Written Opinion dated Mar. 29, 2016", 5 pgs.

"About Fits.me—Virtual Fitting Room", [Online]. Retrieved from the Internet: <URL: http://fits.me/about/about-fits-me/>, (Accessed May 27, 2014), 5 pgs.

"Fitnect", Fitnect Interactive, [Online]. Retrieved from the Internet: <URL: http://www.fitnect.hu/>, (Accessed May 27, 2014), 2 pgs.

"Online clothes-shopping: is an avatar the answer?", The Guardian, [Online]. Retrieved from the Internet: <URL: http://www.theguardian.com/fashion/shortcuts/2012/feb/29/online-clothes-shopping-avatar>, (Accessed May 27, 2014), 4 pgs.

"Virtual Dressing Room", Wikipedia, the free encyclopedia, [Online]. Retrieved from the Internet: <URL: http://en.wikipedia.org/wiki/Virtual_dressing_room>, (Accessed May 27, 2014), 6 pgs.

Pierrepont, Nathalie, "Amongst Promises of a Perfect Fit, What Fits and What Doesn't?", Business of Fashion, [Online]. Retrieved from the Internet: <URL: http://www.businessoffashion.com/2012/12/fashion-2-0-amongst-promises-of-a-perfect-fit-what-fits-and-what-doesn't.html>, (Dec. 19, 2012), 5 pgs.

Wulfhart, Neil, "The Future of Shopping: An Avatar Lets You Find the Perfect Fit", The Slate Group, [Online]. Retrieved from the Internet: <URL: http://www.slate.com/blogs/future_tense/2012/07/19/me_ality_body_scanner_creates_an_avatar_to_make_clothes_shopping_a_breeze_.html>, (Jul. 19, 2012), 3 pgs.

"International Application Serial No. PCT/US2015/037663, International Search Report dated Sep. 14, 2015", 2 pgs.

"International Application Serial No. PCT/US2015/037663, Written Opinion dated Sep. 14, 2015", 8 pgs.

"International Application Serial No. PCT/US2015/044249, International Search Report dated Oct. 23, 2015", 2 pgs.

"International Application Serial No. PCT/US2015/044249, Written Opinion dated Oct. 23, 2015", 5 pgs.

"U.S. Appl. No. 14/450,177, Non Final Office Action dated Aug. 9, 2016", 14 pgs.

"International Application Serial No. PCT/US2015/037663, International Preliminary Report on Patentability dated Jan. 5, 2017", 10 pgs.

(56) References Cited

OTHER PUBLICATIONS

"U.S. Appl. No. 14/450,177, Response filed Aug. 3, 2017 to Final Office Action dated Mar. 3, 2017", 12 pgs.
"U.S. Appl. No. 14/472,125, Non Final Office Action dated May 31, 2017", 17 pgs.
"U.S. Appl. No. 14/450,177, Final Office Action dated Mar. 3, 2017", 11 pgs.
"U.S. Appl. No. 14/450,177, Response filed Feb. 9, 2017 to Non Final Office Action dated Aug. 9, 2016", 14 pgs.
"International Application Serial No. PCT/US2015/042683, International Preliminary Report on Patentability dated Feb. 16, 2017", 7 pgs.
"International Application Serial No. PCT/US2015/044249, International Preliminary Report on Patentability dated Feb. 16, 2017", 7 pgs.
Non-Final Office Action received for U.S. Appl. No. 14/450,177, dated Aug. 25, 2017, 11 pages.
Response to Non-Final Office Action filed on Aug. 31, 2017 for U.S. Appl. No. 14/472,125, dated May 31, 2017, 14 pages.
Final Office Action received for U.S. Appl. No. 14/472,125, dated Oct. 13, 2017, 19 pages.
Non-Final Office Action received for U.S. Appl. No. 14/454,619, dated Jan. 3, 2018, 20 pages.
U.S. Appl. No. 14/472,125, Response filed Feb. 13, 2018 to Final Office Action dated Oct. 13, 2017, 10 pgs.
U.S. Appl. No. 14/450,177, Response filed Feb. 26, 2018 to Non Final Office Action dated Aug. 25, 2017, 13 pgs.
U.S. Appl. No. 14/450,177, Final Office Action dated Apr. 2, 2018, 12 pages.
"A Brief Overview of Gesture Recognition", This page is maintained by Charles Cohen and sponsored by Cybernet Systems Corporation,, [Online]. Retrieved from the Internet: URL: http: homepages.inf.ed.ac.uk rbf CVonline LOCAL_COPIES COHEN gesture_o, (Accessed Feb. 14, 2013), 17 pgs.
"Gesture Design Blog: Gestural Intent", [Online]. Retrieved from the Internet: URL: http: gesturedesignblog.com ?page_id=63, (Mar. 15, 2010), 4 pgs.
"Gesture recognition—Wikipedia, the free encyclopedia", [Online]. Retrieved from the Internet: URL: http: en.wikipedia.org wiki Gesture_recognition, (Accessed Feb. 15, 2013), 6 pgs.
"3D Scanning Services—Konica Minolta 3D Scanning Labs", [Online]. Retrieved from the Internet: URL: http:sensing.konicaminolta.us search-by-services 3d-scanning-services , (Accessed Feb. 15, 2013), 2 pgs.
"U.S. Appl. No. 13/725,209, Non Final Office Action dated Jan. 17, 2014", 8 pgs.
"U.S. Appl. No. 13/725,209, Response filed Apr. 17, 2014 to Non Final Office Action dated Jan. 17, 2014", 15 pgs.
"U.S. Appl. No. 13/725,209, Final Office Action dated May 8, 2014", 7 pgs.
"U.S. Appl. No. 13/725,209, Response filed Sep. 8, 2014 to Final Office Action dated May 8, 2014", 10 pgs.
"U.S. Appl. No. 13/725,209, Non Final Office Action dated Oct. 20, 2014", 8 pgs.
"U.S. Appl. No. 14/474,116, Preliminary Amendment filed Dec. 1, 2014", 7 pgs.
"U.S. Appl. No. 13/679,498, Non Final Office Action dated Jan. 30, 2015", 31 pgs.
"U.S. Appl. No. 13/725,209, Response filed Mar. 20, 2015 to Non Final Office Action dated Oct. 20, 2015", 23 pgs.
"U.S. Appl. No. 13/725,209, Final Office Action dated Apr. 8, 2015", 10 pgs.
"U.S. Appl. No. 13/679,498, Response filed Apr. 30, 2015 to Non Final Office Action dated Jan. 30, 2015", 16 pgs.
"U.S. Appl. No. 13/679,498, Final Office Action dated Jun. 18, 2015", 37 pgs.
"U.S. Appl. No. 13/725,209, Response filed Jul. 8, 2015 to Final Office Action dated Apr. 18, 2015", 19 pgs.
"U.S. Appl. No. 13/679,498, Response filed Aug. 18, 2015 to Non Final Office Action dated Jun. 18, 2015", 12 pgs.
"U.S. Appl. No. 13/679,498, Non Final Office Action dated Sep. 4, 2015", 30 pgs.
"U.S. Appl. No. 13/725,209, Non Final Office Action dated Oct. 6, 2015", 12 pgs.
"U.S. Appl. No. 13/679,498, Response filed Dec. 4, 2015 to Non Final Office Action dated Sep. 4, 2015", 13 pgs.
"U.S. Appl. No. 13/725,209, Response filed Jan. 6, 2016 to Non Final Office Action dated Oct. 6, 2015", 17 pgs.
"U.S. Appl. No. 13/679,498, Final Office Action dated Jan. 22, 2016", 38 pgs.
"U.S. Appl. No. 13/725,209, Final Office Action dated Feb. 26, 2016", 12 pgs.
"U.S. Appl. No. 13/679,498, Response filed May 23, 2016 to Final Office Action dated Jan. 22, 2016", 14 pgs.
"U.S. Appl. No. 13/679,498, Examiner Interview Summary dated May 2, 2016", 3 pgs.
"U.S. Appl. No. 13/679,498, Non Final Office Action dated Jun. 30, 2016", 38 pgs.
"U.S. Appl. No. 13/725,209, Response filed May 26, 2016 to Final Office Action dated Feb. 26, 2016", 10 pgs.
"U.S. Appl. No. 13/725,209, Non Final Office Action dated Sep. 9, 2016", 11 pgs.
"U.S. Appl. No. 13/679,498, Response filed Sep. 30, 2016 to Non Final Office Action dated Jun. 30, 2016", 15 pgs.
"U.S. Appl. No. 13/679,498, Final Office Action dated Nov. 4, 2016", 37 pgs.
"U.S. Appl. No. 14/474,116, Non Final Office Action dated Jan. 25, 2017", 18 pgs.
"U.S. Appl. No. 13/679,498, Response filed Apr. 4, 2017 to Final Office Action dated Nov. 4, 2016", 13 pgs.
"U.S. Appl. No. 14/474,116, Response filed Apr. 25, 2017 to Non Final Office Action dated Jan. 25, 2017", 10 pgs.
"U.S. Appl. No. 13/679,498, Non Final Office Action dated May 15, 2017", 40 pgs.
"U.S. Appl. No. 14/474,116, Final Office Action dated Jul. 20, 2017", 12 pgs.
"U.S. Appl. No. 13/679,498, Examiner Interview Summary dated Aug. 21, 2017", 3 pgs.
"U.S. Appl. No. 13/679,498, Response filed Aug. 31, 2017 to Non Final Office Action dated May 15, 2017", 12 pgs.
"U.S. Appl. No. 14/474,116, Examiner Interview Summary dated Sep. 19, 2017", 3 pgs.
"U.S. Appl. No. 14/474,116, Respone filed Sep. 28, 2017 to Final Office Action dated Jul. 20, 2017", 11 pgs.
"U.S. Appl. No. 13/679,498, Notice of Allowance dated Oct. 5, 2017", 12 pgs.
"U.S. Appl. No. 14/474,116, Non Final Office Action dated Nov. 1, 2017", 12 pgs.
"U.S. Appl. No. 13/679,498, Corrected Notice of Allowance dated Jan. 8, 2018", 12 pgs.
"U.S. Appl. No. 15/868,167, Preliminary Amendment filed Jan. 18, 2018", 9 pgs.
"U.S. Appl. No. 14/474,116, Examiner Interview Summary dated Feb. 1, 2018", 3 pgs.
"U.S. Appl. No. 14/474,116, Response filed Feb. 1, 2018 to Non Final Office Action dated Nov. 1, 2017", 11 pgs.
"U.S. Appl. No. 14/454,619, Response filed Jun. 4, 2018 to Non Final Office Action dated Jan. 3, 2018", 17 pgs.
"U.S. Appl. No. 14/450,177, Examiner Interview Summary dated Jun. 29, 2018", 3 pgs.
"U.S. Appl. No. 14/472,125, Non Final Office Action dated Jul. 12, 2018", 21 pgs.
""Non-Final Office Action received for U.S. Appl. No. 14/474,116 dated Mar. 28, 2018"", (Mar. 28, 2018), 12 pages.
"Trying on Shoes Made Easy at the Adidas Shop in Paris", [Online]. Retrieved from the Internet: URL: http: www.geeksugar.com Trying-Shoes-Made-Easy-Adidas-Shop-Pads-159420, (Mar. 6, 2007), 5 pgs.
"The Future of Shopping Is Here", [Online]. Retrieved from the Internet: URL: http: www.simplyzesty.comadvertising-and-marketing the-future-of-shopping-is-here-video , (Jun. 12, 2012), 9 pgs.

(56) References Cited

OTHER PUBLICATIONS

"Get Your Converse Shoes on Virtually Using Augmented Reality", 2012 Digital Analog an Online Publication for Creativity Code, [Online]. Retrieved from the Internet: URL: http: digitalanalog.in 2011 03 14 get-your-converse-shoes-on-virtually-using-augmented-reality , (Mar. 14, 2011), 7 pgs.

"HowStuffWorks: Electronics", [Online]. Retrieved from the Internet: URL: http: electronics.howstuffworks.com , (Accessed Feb. 14, 2013), 2 pgs.

"Skyrim Kinect—YouTube", [Online]. Retrieved from the Internet: URL: http: www.youtube.com watch?v=Z83wzJwrBK0, (Accessed Feb. 14, 2012), 2 pgs.

"GestureTek", GestureTeck Inc. is Purchased Back by Co-Founder Vincent John Vincent, [Online]. Retrieved from the Internet: URL: http: www.gesturetek.com , (Accessed Feb. 15, 2013), 1 pg.

"Top 10 Best Kinect Hacks", [Online]. Retrieved from the Internet: URL: http: www.kinecthacks.com top-10-best-kinect-hacks, (Accessed Feb. 15, 2013), 6 pgs.

"Gesture Technology Virtual Dressing rooms!! Punitatannas Blog", [Online]. Retrieved from the Internet: URL: http:punitatanna. wordpress.com 2010 08 31 gesture-technology-virtual-dressing-rooms , (Aug. 31, 2010), 5 pgs.

"Kinect—Wikipedia, the free encyclopedia", (Accessed Feb. 15, 2013), 16 pgs.

"Kinect_calibration technical—ROS Wiki", [Online]. Retrieved from the Internet: URL: http: www.ros.org wikikinect_calibration technical, (Accessed Feb. 15, 2013), 8 pgs.

"Metail: translating cutting edge research into commercial success", [Online]. Retrieved from the Internet: URL: http: www.eng.cam. ac.uk news stories 2012 Me_tail , (Mar. 15, 2012), 5 pgs.

"SketchUp—How to Information | eHow.com", [Online]. Retrieved from the Internet: URL: http: www.ehow.comsketchup , (Accessed Feb. 15, 2013), 27 pgs.

"My Style Rules—The way you were meant to dress", [Online]. Retrieved from the Internet: URL: http: mystylerules.com , (Accessed Feb. 15, 2013), 1 pg.

"Kinect Body Scanning—Body Scanning Reinvented", [Online]. Retrieved from the Internet: URL: http: www.styku.com business benefits bodyscanning , (Accessed Feb. 15, 2013), 2 pgs.

"Gestures control true 3D display", [Online]. Retrieved from the Internet: URL: Info collage around internet: Gestures control true 3D display, (Dec. 29, 2004), 2 pgs.

Baudel, Thomas, "Charade: Remote Control of Objects using Free-Hand Gestures", [Online]. Retrieved from the Internet: URL: http: thomas.baudel.name Morphologie cacm.html, (Accessed Feb. 15, 2013), 9 pgs.

Billinghurst, Mark, "Chapter 14: Gesture Based Interaction", [Online]. Retrieved from the Internet: URL: http:www.billbuxton.com input14. Gesture.pdf , (Aug. 24, 2011), 35 pgs.

Cordier, Frederic, "Made-to-Measure Technologies for Online Clothing Store", [Online]. Retrieved from the Internet: URL: http: www.miralab.ch repository papers 25.pdf, (Accessed Feb. 15, 2013), 12 pgs.

Crawford, Stephanie, "HowStuffWorks: How Microsoft Kinect Works", [Online]. Retrieved from the Internet: URL: http: electronics. howstuffworks.com microsoft-kinect.htm, (Accessed Feb. 14, 2013), 2 pgs.

Daly, Erica, "This is the Year of the Virtual Fit Assistant | Techli", [Online]. Retrieved from the Internet: URL: http:techli.com 2011 11 year-of-virtual-fit-assistant , (Nov. 16, 2011), 3 pgs.

Higgins, Krystal, "Designing Kinect-Based Experiences", [Online]. Retrieved from the Internet: URL: http: www.kryshiggins.com thoughts-on-designing-kinect-based-experiences , (Apr. 4, 2011), 12 pgs.

Horsey, Julian, "Augmented Reality App Allows You to Try Clothes Before You Buy in a Virtual Dressing Room video", [Online]. Retrieved from the Internet: http: www.geeky-gadgets.com augmented-reality-app-allows-you-to-try-clothes-before-you-buy-in-a-virtual-dressing-room, (Sep. 29, 2010), 9 pgs.

Hunter, Seth, "WordPlay: A Table-Top Interface for Collaborative Branstorming and Decision Making", Proceedings of IEEE Tabletops and Interactive Surfaces, 2008, [Online]. Retrieved from the Internet: URL: http: fluid.media.mit.edu sites default files WordPlayFinalIEEE_AffiliationIncluded.pdf, (2008), 4 pgs.

Kimbrel, Heather, "How to Create a Virtual Model of My Body Measurements | eHow.com", [Online]. Retrieved rom the Internet: URL: http: www.ehow.com how_6817795_create-virtual-model-body-measurements.html, (Accessed Feb. 15, 2013), 3 pgs.

Li, Rong, "Research of Interactive 3D Virtual Fitting Room on Web Environment", ISCID Proceedings of the 2011 Fourth International Symposium on Computational Intelligence and Design—vol. 01, [Online]. Retrieved from the Internet: URL: http: ieeexploreieee.org xpl articleDetails.jsp?reload=trueandarnumber=6079627andcontent-Type=Conference+Publications, (2011), 32-35.

MacCormick, John, "How does the Kinect work?", [Online]. Retrieved from the Internet: URL: http: users.dickinson.edu ~jmac selected-talks kinect.pdf, (Accessed Feb. 15, 2013), 52 pgs.

Newitz, Annalee, "10 physical gestures that have been patented", (Jun. 6, 2011), 5 pgs.

Nickinson, Phil, "Front-facing cameras mean hand-free gesture commands for Android", [Online]. Retrieved from the Internet: URL: http: www.androidcentral.com front-facing-cameras-mean-hands-free-gesture-co . . . , (Accessed Feb. 14, 2013), 6 pgs.

Rosenfeld, Azriel, "Picture Processing by Computer", Academic Press, (1969), 28 pgs.

Saldanha, Carlos, "System and Method for Displaying Selected Garments on a Computer-Simulated Mannequin", [Online]. Retrieved from the Internet: URL: http: www.faqs.org patents app 20100302275, (Dec. 2, 2010), 10 pgs.

Slawski, Bill, "Would You Give a Search Engine a 3D Model of Your Body?—SEO by the Sea", [Online]. Retrieved from the Internet: URL: http: www.seobythesea.com 2009 01 would-you-give-a-search-engine-a-3d-model-of-your-body , (Jan. 16, 2009), 11 pgs.

Sterling, Bruce, "Beyond the Beyond—Augmented Reality: Kinect fitting-room for TopShop, Moscow", [Online]. Retrieved from the Internet: URL: http: www.wired.com beyond_the_beyond 2011 05 augmented-reality-kinect-fitting-room-for-topshop-moscow , (May 10, 2011), 2 pgs.

Stevens, Tim, "Apple patent application opens the door to free-form acoustic gesture commands", [Online]. Retrieved from the Internet: URL: http: www.engadget.com 2011 02 21 apple-patent-application-opens-the-door-to . . . , (Feb. 21, 2011), 3 pgs.

Woolley, Richard, "Gesture Commands Performed in Proximity but Without Make Physical Contact with a Touchpad", [Online]. Retrieved from the Internet: URL: http: www.faqs.org patents app 20090167719, (Jul. 2, 2009), 4 pgs.

"Augmented Reality Virtual Fitting Room", Retrieved from the Internet URL: <https://www.youtube.com/watch?v=F-3qC4q8toU>, Feb. 15, 2012, 2 pages.

"Online Fitting Room Shopping Augmented Reality", Retrieved from the Internet URL: <https://www.youtube.com/watch?v=OHAyOtluqtY>, Apr. 29, 2011, 2 pages.

"Using A Clinometer To Measure Height", Retrieved from the Internet, URL: http://www.instructables.com/id/Using-a-clinometer-to-measure-height/, April 23, 2013, 16 pages.

Selle et al., "Robust High-Resolution Cloth Using Parallelism, History-Based Collisions and Accurate Friction", IEEE Transactions on Visualization and Computer Graphics, vol. 15, No. 2, 2009, Mar.-Apr. 2009, pp. 1-12.

Applicant Initiated Interview Summary Received for U.S. Appl. No. 14/474,116 dated Apr. 27, 2018, 3 pages.

Response to Non-Final Office Action filed on Jun. 27, 2018, for U.S. Appl. No. 14/474,116 , dated Mar. 28, 2018, 27 pages.

Final Office Action received for U.S. Appl. No. 14/474,116, dated Jul. 27, 2018, 11 pages.

Applicant-Initiated Interview Summary received for U.S. Appl. No. 14/474,116, dated Aug. 14, 2018, 3 pages.

Response to Final Office Action filed on Sep. 28, 2018, for U.S. Appl. No. 14/474,116, dated Jul. 27, 2018, 15 pages.

Response to Final Office Action filed on Oct. 1, 2018, for U.S. Appl. No. 14/450,177, dated Apr. 2, 2018, 13 pages.

(56) References Cited

OTHER PUBLICATIONS

Non-Final Office Action received for U.S. Appl. No. 14/450,177, dated Oct. 19, 2018, 13 pages.
Final Office Action received for U.S. Appl. No. 14/454,619, dated Nov. 2, 2018, 25 pages.
Response to Non-Final Office Action filed on Nov. 20, 2018, for U.S. Appl. No. 14/472,125 , dated Jul. 12, 2018, 15 pages.
Final Office Action received for U.S. Appl. No. 14/450,177, dated Apr. 15, 2019, 14 pages.
Response to Non-Final Office Action filed on Apr. 1, 2019 for U.S. Appl. No. 14/450,177, dated Oct. 19, 2018, 13 pages.
Non-Final Office action received for U.S. Appl. No. 14/454,619 dated Apr. 15, 2019, 31 pages.
Response to Final Office Action filed on Jan. 29, 2019 for U.S. Appl. No. 14/454,619, dated Nov. 2, 2018, 18 pages.
Notice of Allowance received for U.S. Appl. No. 14/472,125, dated Feb. 7, 2019, 9 pages.
Kinect, "Kinect—Virtual Dressing Room", Retrieved from the Internet URL: <http://x-tech.am/kinect-virtual-dressing-room>, X-Tech Blog, 2014, 5 pages.
Non-Final Office action received for U.S. Appl. No. 15/868,167 dated Mar. 21, 2019, 28 pages.
Final Office Action received for U.S. Appl. No. 14/528,916, dated Apr. 5, 2019, 20 pages.
Notice of Allowance received for U.S. Appl. No. 14/474,116, dated Mar. 22, 2019, 7 pages.
Applicant Initiated Interview Summary received for U.S. Appl. No. 14/474,116, dated Feb. 1, 2019, 3 pages.
Advisory Action received for U.S. Appl. No. 14/450,177, dated May 16, 2019, 3 pages.
Response to Final Office Action filed on May 10, 2019, for U.S. Appl. No. 14/450,177, dated Apr. 15, 2019, 11 pages.
Applicant-Initiated Interview Summary received for U.S. Appl. No. 15/868,167, dated Apr. 18, 2019, 4 pages.
Response to Non Final Office Action filed on Jun. 13, 2019, for U.S. Appl. No. 15/868,167, dated Mar. 21, 2019, 20 pages.
Non-Final Office Action received for U.S. Appl. No. 14/450,177, dated Jul. 30, 2019, 14 pages.
U.S. Appl. No. 16/411,748, filed May 14, 2019, Methods and Systems for Virtual Fitting Rooms or Hybrid Stores.

* cited by examiner

DIGITAL AVATARS IN ONLINE MARKETPLACES

TECHNICAL FIELD

Example embodiments of the present application generally relate to processing data and, more particularly in one embodiment, to a system and method for facilitating virtual representations of users and products.

BACKGROUND

Marketplaces can be online and/or real world (e.g., brick and mortar). Online marketplaces can include websites or mobile applications where users may buy or sell goods or services (referred to collectively as "items") from a provider of the online marketplace or other users of the online marketplace. The goods or services (referred to collectively as "items") are described in a published listing. Similar to online marketplaces, real-world marketplaces may have websites that allows users to view inventory or interact with the real-world marketplace. Any of these online browsing environments may serve online advertisements to users during the course of their pursuits of online activities.

BRIEF DESCRIPTION OF THE DRAWINGS

In the drawings, which are not necessarily drawn to scale, like numerals may describe similar components in different views. Like numerals having different letter or numeric suffixes may represent different instances of similar components. The drawings illustrate generally, by way of example, but not by way of limitation, various embodiments discussed in the present document.

DETAILED DESCRIPTION

Figure 1:
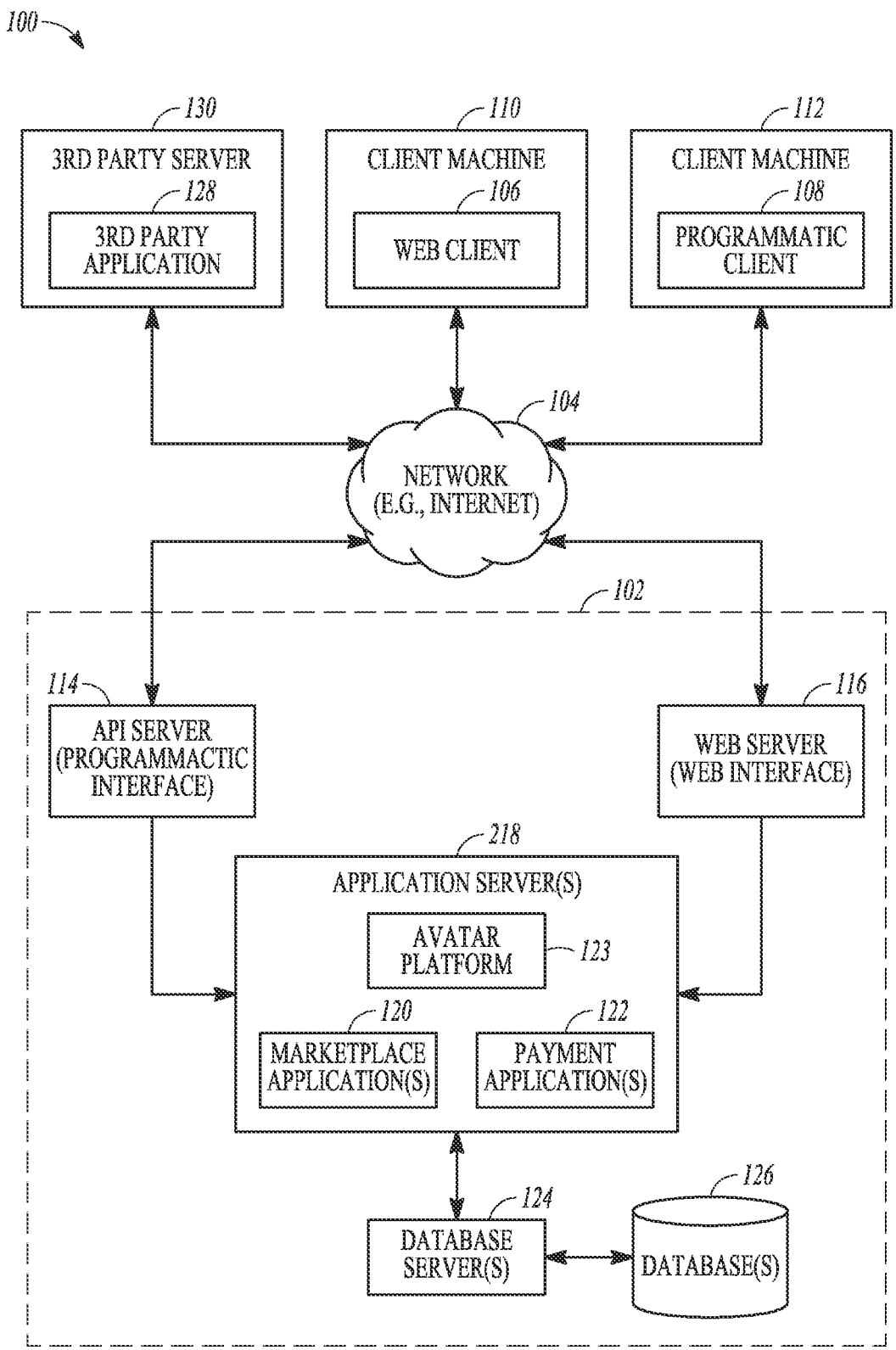
FIG. 1 is a network diagram depicting a client-server system, within which one example embodiment may be deployed.

Reference will now be made in detail to specific example embodiments for carrying out the inventive subject matter. Examples of these specific embodiments are illustrated in the accompanying drawings. It will be understood that they are not intended to limit the scope of the claims to the described embodiments. On the contrary, they are intended to cover alternatives, modifications, and equivalents as may be included within the spirit and scope of the disclosure as defined by the appended claims. In the following description, specific details are set forth in order to provide a thorough understanding of the subject matter. Embodiments may be practiced without some or all of these specific details. In addition, well known features may not have been described in detail to avoid unnecessarily obscuring the subject matter.

In accordance with the present disclosure, components, process steps, and/or data structures may be implemented using various types of operating systems, programming languages, computing platforms, computer programs, and/or general purpose machines. In addition, those of ordinary skill in the art will recognize that devices of a less general purpose or nature, such as hardwired devices, field programmable gate arrays (FPGAs), application specific integrated circuits (ASICs), or the like, may also be used without departing from the scope and spirit of the concepts disclosed herein. Embodiments may also be tangibly embodied as a set of computer instructions stored on a computer readable medium, such as a memory device.

Example methods and systems for providing data to display digital avatars to be displayed on devices are described. In the following description, for purposes of explanation, numerous specific details are set forth in order to provide a thorough understanding of example embodiments. It will be evident, however, to one skilled in the art that the present invention may be practiced without these specific details.

One of the biggest concerns for e-commerce sellers is how to provide a shopping experience that is similar to shopping at a brick and mortar store. Shopping in a physical retail store evokes an emotional response: seeing the clothing, touching the items, hearing the store music, and seeing how one looks the apparel. There can also be a social aspect.

Groups of people may shop together, thereby facilitating recommendations of outfits, feedback on how items look on their friends, and any number of social interactions.

In contrast, online marketplaces may attempt to demonstrate how an item looks by showing an image of the item on a professional model. It may be difficult for users to envision how the item may look on the user instead. Moreover, online marketplaces may not effectively facilitate social interactions between users. That is, e-commerce shopping may provide a more solitary experience than shopping at a brick-and-mortar store. E-commerce shopping, therefore, may not include some of the fun, social aspects that may be enjoyed by shopping at brick-and-mortar stores.

One result of online marketplaces not being able to match these in-store experiences is that users may be discouraged from making purchases. The problem arises as how to provide an e-commerce shopping experience that has some of the features as shopping at a brick and mortar store.

In an example embodiment, a digital avatar system provides data for displaying a digital avatar of the user. For example, a digital avatar may be generated, in part, based on measurement data of the user in order to provide a realistic look. Moreover, online marketplaces, such as websites or mobile applications, may support features that facilitate configuring a digital avatar to be shown as wearing the items of the online marketplace. As such, a user shopping on the online marketplace may select one or more products for displaying the selected product on a digital avatar of the user. The digital avatar may be generated based on the measurement data of the user and the size of the selected product. In this way, the user may see a digital representation of the user wearing the product so that the user can evaluate how the product the look on the user.

Additionally or alternatively, the data for generating the digital avatars may be shared between users, for example, by using a social network. In one aspect, a user may dress the digital avatar of a friend. Moreover, the user may share the "dressed up" digital avatar of the friend with the friend as a way to recommend an item, such as a shirt, a pair of jeans, a hat, or the like. Additionally or alternatively, a user may share his or her own digital avatar configured with one or more selected products in order to obtain comments from friends and/or contacts.

By allowing users to share digital avatar data with other users, a digital avatar system may facilitate "e-stylist" services. For example, a user ("customer") may hire a professional e-stylist who has access to the digital avatar data of the customer. The e-stylist may send to the customer one or more versions of the user's digital avatar. Each version may correspond to a different look, such as a different outfit. The professional e-stylists may receive compensation for products purchased based on the e-stylists recommendations. It will be appreciated that friends of the user may serve as an e-stylist, with or without compensation. Moreover, online marketplaces may provide paid or free e-stylist services to recommend targeted products to the customers.

FIG. 1 is a network diagram depicting a client-server system 100, within which one example embodiment may be deployed. A networked system 102, in the example forms a network-based marketplace or publication system, provides server-side functionality, via a network 104 (e.g., the Internet or Wide Area Network (WAN)) to one or more clients. FIG. 1 illustrates, for example, a web client 106 (e.g., a browser), and a programmatic client 108 executing on respective client machines/devices 110 and 112.

An Application Program interface (API) server 114 and a web server 116 are coupled to, and provide programmatic and web interfaces respectively to, one or more application servers 118. The application servers 118 host one or more marketplace applications 120, payment applications 122, and the avatar platform 123. The application servers 118 are, in turn, shown to be coupled to one or more databases servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for items that are made available via the marketplace applications 120.

Further, while the system 100 shown in FIG. 1 employs a client-server architecture, the present invention is of course not limited to such an architecture, and could equally well find application in a distributed, or peer-to-peer, architecture system, for example. The various marketplace and payment applications 120, 122 could also be implemented as stand-alone software programs, which do not necessarily have networking capabilities.

In addition, while the various marketplace and payment applications 120, 122 have been described above as having separate functionalities, in alternative embodiments these functionalities may be performed by any one or more of the various marketplace and payment applications 120, 122.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application the TURBOLISTER™ application developed by EBAY INC.™, of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Example Mobile Device

Figure 2:
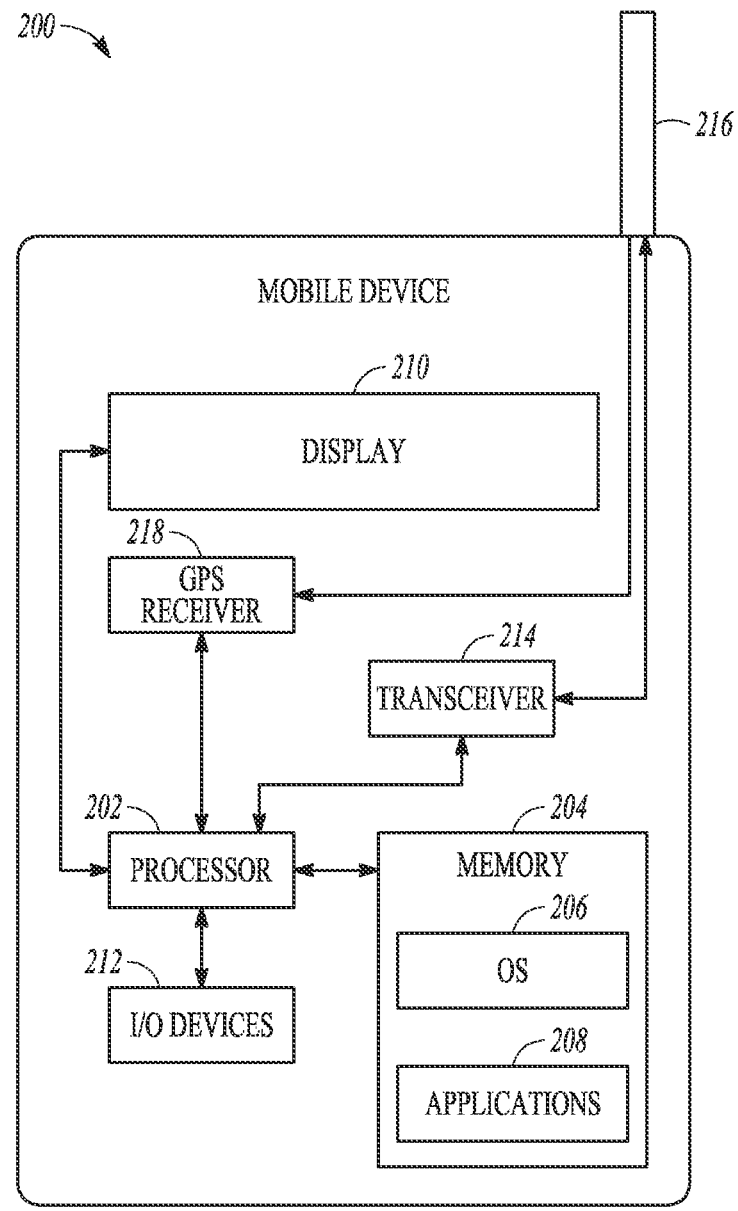
FIG. 2 is a block diagram illustrating a mobile device, according to an example embodiment.

FIG. 2 is a block diagram illustrating a mobile device 200, according to an example embodiment. The mobile device 200 may include a processor 202. The processor 202 may be any of a variety of different types of commercially available processors suitable for mobile devices (for example, an XScale architecture microprocessor, a Microprocessor without Interlocked Pipeline Stages (MIPS) architecture processor, or another type of processor). A memory 204, such as a random access memory (RAM), a Flash memory, or other type of memory, is typically accessible to the processor. The memory 204 may be adapted to store an operating system (OS) 206, as well as application programs 208, such as a mobile location enabled application that may provide Location Based Services (LBSs) to a user. The processor 202 may be coupled, either directly or via appropriate intermediary hardware, to a display 210 and to one or more input/output (I/O) devices 212, such as a keypad, a touch panel sensor, a microphone, and the like. Similarly, in some embodiments, the processor 202 may be coupled to a transceiver 214 that interfaces with an antenna 216. The transceiver 214 may be configured to both transmit and receive cellular network signals, wireless data signals, or other types of signals via the antenna 216, depending on the nature of the mobile device 200. Further, in some configurations, a GPS receiver 218 may also make use of the antenna 216 to receive GPS signals.

Example Digital Avatar Systems

Figure 3:
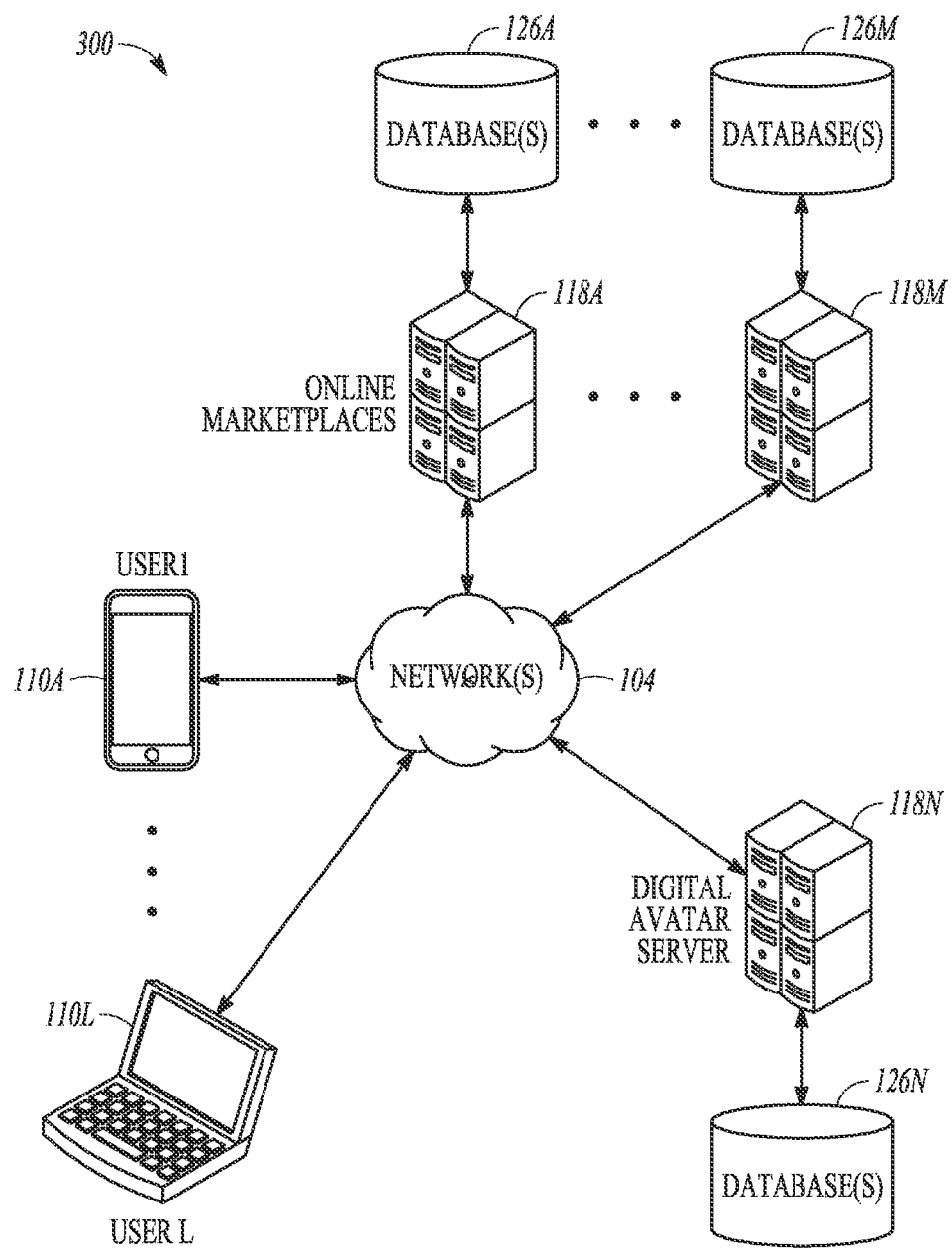
FIG. 3 is a network diagram depicting an example embodiment of a digital avatar network including multiple devices forming at least a portion of the client-server system of FIG. 1.

FIG. 3 is a network diagram depicting an example embodiment of a digital avatar network 200 including multiple devices forming at least a portion of the client-server system 100 of FIG. 1. The digital avatar network 200 may include one or more user devices 110A-L, one or more servers 118A-N, and one or more databases 126A-N.

In the illustrated embodiment, the one or more user devices 110A-110L are interconnected to one or more online marketplace servers 118A-118M via the network 104 for communicating online marketplace resources and/or data (e.g., data or code related to a webpage or software application of the online marketplace). The databases 126A-M may store data of the respective online marketplaces and/or marketplace accounts of the users of the devices 110A-M. Additionally, the digital avatar server 118N may be interconnected to the user devices 110A-M and the online marketplace servers 118A-M via the network 104 for providing digital avatar services for the user's and/or the online marketplaces.

In operation, the user devices 110A-L may render user interfaces for online marketplaces to browse and purchase items. The user interfaces may be rendered based on data provided by the online marketplace servers 118A-M. Each of the online marketplace servers 118A-M may correspond to different vendors (e.g., retailers). In one example embodiment, the online marketplaces may correspond to clothing retailers. However, it will be appreciated that in alternative embodiments, the other types of marketplaces are contemplated. For example, example marketplaces may include any marketplace selling items that may be placed on the user's person (e.g., makeup and other cosmetics) and/or the user may be placed in or on the item (e.g., a car, furniture, and the like).

As will be described in greater detail below, the user interfaces may display a digital avatar of a user for showing the digital avatar with a selected item. For example, the respective users of the user devices may create user accounts for storing data related to the digital avatars. For example, the user device 110A may connect to the digital avatar server 118 via a dedicated website, via a marketplace website, or an application executing on the user device 110A-L. Once connected, the user device 110A may transmit data to the digital avatar server 118N for creating or modifying a user account. The user account may include data for generating the digital avatar of the user, which will be described in greater detail later in connection with FIG. 6.

On the vendor side, the respective online marketplace servers 118A-M may create vendor accounts. An example of a data structure of a vendor account will be described in greater to detail later in connection with FIG. 6. With a vendor account, an online marketplace server e.g., one of the servers 118A-M) may provide the digital avatar server 118N data for creating a product record. The product record may be used in conjunction with data of a selected user account for generating a digital avatar in the selected product.

In an example embodiment, each of the online marketplace servers 118A-M may access the digital avatar server 118N to access the user accounts stored in the database 126. In this way, for example, the digital avatar server 118N may provide avatar data as a service. Moreover, in some embodiments, the digital avatar network 200 may define interfaces and protocols for providing avatar services such that a user account may be used by the plurality of online marketplace servers 118A-M. As such, an avatar may be generating wearing items from two or more online marketplaces. Another embodiment, users of the user devices 110 may share avatar data with other users, as will be described in greater detail.

Figure 4:
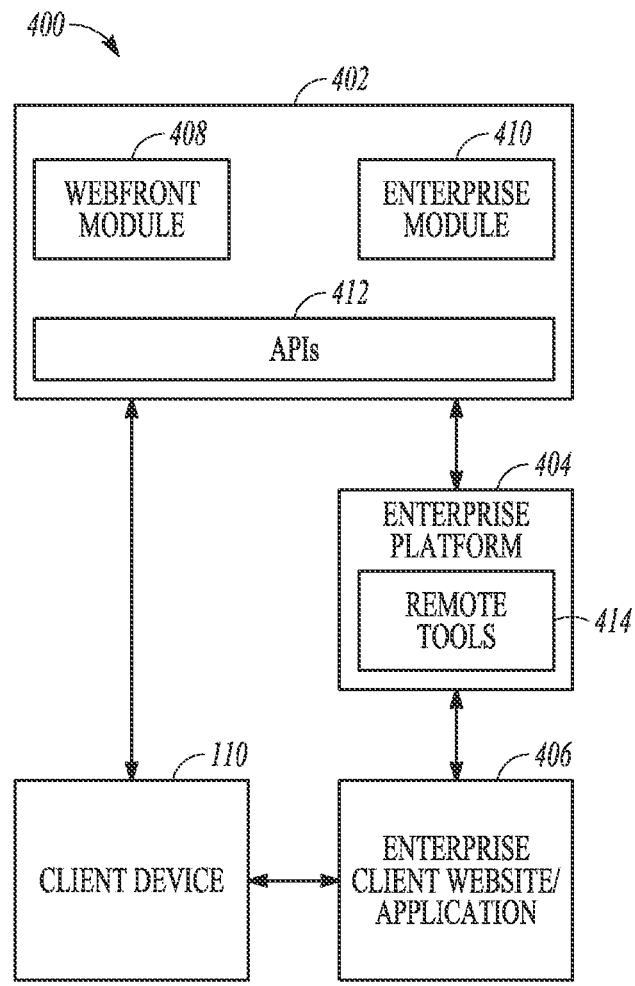
FIG. 4 is a block diagram illustrating an example embodiment of a digital avatar network forming at least a portion of the client-server system of FIG. 1.

FIG. 4 is a block diagram illustrating an example embodiment of a digital avatar network 400 forming at least a portion of the client-server system of FIG. 1. The digital avatar network 400 includes an avatar platform 402, an enterprise platform 404, an enterprise client 406, and a client device 110 of FIG. 1. The avatar platform 402 may include a web front module 408, an enterprise module 410, and one or more APIs 412 for interacting with the enterprise platform 404 and/or the client device 110. The enterprise platform 404 may include remote tools 414. The avatar platform 402 may correspond to the digital avatar server 118N of FIG. 3. The enterprise platform 404 and the enterprise client 406 may correspond to one or more of the online marketplace servers 118A-M of FIG. 3. In alternative embodiments, the components of FIG. 4 may be included by alternative components of FIG. 1.

The enterprise module 410 of the avatar platform 402 may facilitate integrating information for customization with the enterprise platform 404 and the remote tools 414. For example, the enterprise module 410 may provide configuration and rules based options that provides vendors the capability to decide on which digital avatar feature need to be made available to users on their sites. For example, a vendor may provide a template that designates a front view image of the digital avatar must be provided in order for the product to comply with the digital avatar services. The enterprise module 410 may provide options for users to "share" their avatar data with others for pair-shopping (so you can "take your avatar friend" shopping with you). The enterprise module 410 may also provide options for users to go virtual shopping with avatars of family members, friends, contacts, or other users. As stated above, a user may share avatar data with other users so the users can "take you out" shopping on partner websites.

The web front module 408 may provide a customer facing user interface module for capturing the customer attributes. In an example embodiment, a user may upload photos in certain poses (so system can digitize measurements in standard manner). Dress attributes for a user may be captured based on, for example, 2-3 photos that user uploaded. As will be described later detail below, using the photos, as well as the height and/or weight of the user, the avatar platform 402 may identify dress measurements (e.g., six or more measurements) that a tailor may use. Accordingly, one example embodiment, the avatar platform 42 may serve as an "e-tailor" system for automated custom dress measurements and fittings. It will be appreciated that the avatar platform 402 may digitally measurements of user based on uploaded user photos using mathematical algorithm or third party APIs.

The web front module 408 may provide a user interface prompting users to input specified attributes—such as, but are not limited to, age, favorite color, style choices, etc. The web front module 408 may prompt users other optional features like family, area of residence, etc. The avatar platform 402 may save this information in a user account (also referred to herein as "user record"). Users may update or edit the user account via the web front module 408 in an example embodiment.

The APIs 412 may make user account data available to third-party applications and/or services. For example, within applications of the avatar platform 402, as well as external applications (e.g., third-party online vendors), may integrate products, webpages, applications, services, and the like to digital avatar data. For example, the remote tools 414 may facilitate creating or modifying product records that support digital avatar services. The data to create or modify product records may be sent to the digital avatar platform 402 through vendor-facing portion of the API 412. Accordingly, the avatar platform 402 may facilitate integration with third party systems, such as Mobile/Tablet apps, Business-to-Consumer (B2C), web service calls, etc., and may facilitate licensing avatar data and/or services.

As stated above, the enterprise platform 404 and remote tools 414 may provide the administrator a way to set up an online marketplace for the digital avatar system. For example, the administrator may indicate that an item is avatar enabled, whereas other items may not. The remote tools 414 may prompt the vendor user to enter attributes for the item. The avatar platform 402 may provide a preview of the item on a default avatar profile. After which, the administrator may confirm and save the settings. The remote tools 414 may also provide the administrator with the ability to apply the same settings to multiple items using a template of attributes.

Figure 5:
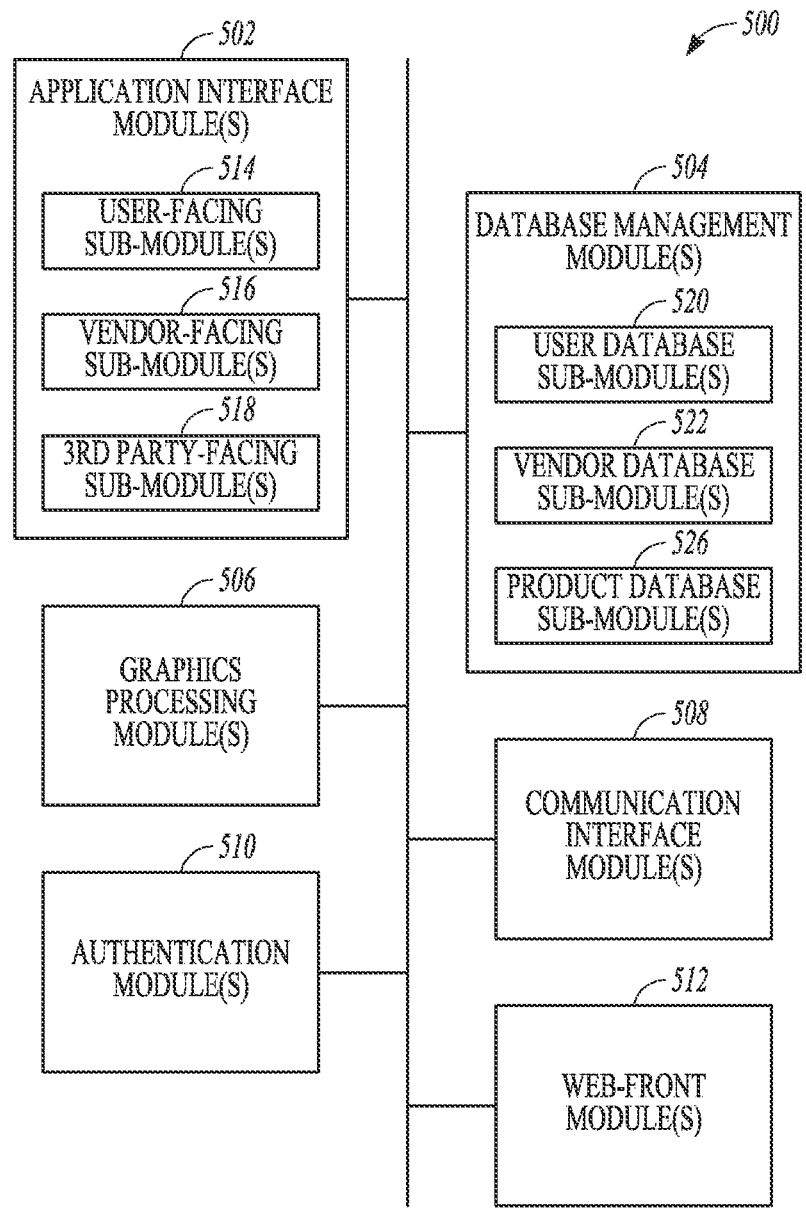
FIG. 5 is a block diagram illustrating an example embodiment of a digital avatar system including multiple modules forming at least a portion of the client-server system of FIG. 1.

FIG. 5 is a block diagram illustrating an example embodiment of a digital avatar system 500 including multiple modules forming at least a portion of the client-server system of FIG. 1. The modules 502-512 of the illustrated digital avatar system 500 include an application interface module(s) 502, a database management module(s) 504, a graphics processing module(s) 506, a communication interface module(s) 508, an authentication module(s) 510, and a web-front module 512. The application interface module 502 includes a user-facing sub-module(s) 514, a vendor-facing sub-module(s) 516, and the third-party facing sub-module(s) 518, which may correspond to APIs. The database management module 504 may include a user database sub-module(s) 520, a vendor database sub-module(s) 522, and a product database sub-module(s) 526.

In some embodiments, the components of the digital avatar system 500 can be included by the avatar platform 123 of FIG. 1. However, it will be appreciated that in alternative embodiments, one or more components of the digital avatar system 500 described below can be included, additionally or alternatively, by other devices, such as one or more of the applications 120, 122, the servers 114, 116, 118, 130, the network 104, and/or the client machines 110, 112 of FIG. 1.

The modules 502-512 of the digital avatar system 500 may be hosted on dedicated or shared server machines (not shown) that are communicatively coupled to enable communications between server machines. Each of the modules 502-512 are communicatively coupled (e.g., via appropriate interfaces) to each other and to various data sources, so as to allow information to be passed between the modules 502-512 of the digital avatar system 500 or so as to allow the modules 502-512 to share and access common data. The various modules of the digital avatar system 500 may furthermore access one or more databases 124 via the database servers 126.

The digital avatar system 500 may facilitate generating and displaying digital avatar data corresponding to a digital representation of a user with a product. The digital avatar system 500 may receive user data for generating or updating user accounts containing measurement data and/or image data of the user. Likewise, the digital avatar system 500 may receive vendor data for generating or updating vendor accounts, which may include one or more product records. For example, each product record may include one or more variations of image data to provide model data for sizes of the product on various sizes of avatars (e.g., a size-small shirt on a size-15 avatar, a size-medium shirt on a size-15 avatar, a size-medium shirt on a size-15.5 avatar, etc.).

In operation, a user may access a selected user account and a selected product record in order to generate a digital avatar for display. For example, the digital avatar system 500 may receive an avatar request message originating from a user device (e.g., a client device 110 of FIG. 1). The digital avatar system 500 may, in turn, provide model data to the requesting user device or to another user device in accordance with the avatar request message. Moreover, the user device receiving the model data may share the model data with another user. In these ways, the digital avatars system 500 may also facilitate sharing digital avatars between users.

To this end, the digital avatar system 500 is shown to include the application interface module 502, the database management module 504, the graphics processing module 506, the communication interface module 508, the authentication module 510, and the web-front module 512, which may serve to provide digital avatars.

The application interface module 502 may be a hardware-implemented module which may be configured to communicate data with client devices. Relative to the digital avatar system 500, client devices may include user devices, such as client device 110 of FIG. 1, and/or vendor devices, such as online marketplace servers 118 of FIG. 1. For example, the digital avatar system 500 may support digital avatar services for both user devices and vendor devices. For facilitating digital avatar services, the application interface module 502 may include the user-facing and vendor facing sub-module 514, 516 for interfacing with user devices and vendor devices, respectively.

Additionally or alternatively, the digital avatar system 500 may communicate with third party devices for providing or receiving data or services. Third party devices may include vendors that provide data storage or processing, such as image processing or social networking services. Another example of a third-party device may be e-stylists who utilize data and services of the digital avatar system 500 for making recommendations to, and/or purchases on the behalf of, other users. It will be appreciated that an e-stylist may provide free or paid services. For example, a professional e-stylist may receive a commission from either the user or vendors for purchases. As another example, an e-stylist may be a friend or contact of the user and may provide recommendations as a free social activity. Accordingly, the application interface module 502 may include the third-party-facing sub-module 518 for interfacing with third-party devices and facilitating third-party services.

In operation, the application interface module 502 may receive an avatar request message that corresponds to a request to render a digital representation of a target user combined with a target product. For example, the target user may correspond to the requesting user or a contact who provided access privileges to the contact's avatar data. An example of a digital representation of a target user combined with the target product includes the digital avatar of the target user being displayed as wearing the target product, which may be an article of clothing or a fashion accessory.

In an example embodiment, the user-facing sub-module 514 of the application interface module 502 may receive the avatar request message as an input from a client device 110. The client device 110 may have transmitted the avatar request message in response to user input, such as the user selecting a user interface element for displaying the digital avatar of the target user with the target product. Accordingly, the avatar request message may be associated with a user identifier indicative of the target user and a product identifier indicative of the target product. For example, the avatar request message may correspond to a data packet that includes the user identifier and/or the product identifier. It will be appreciated, however, that in alternative embodiments, the request message need not include the user identifier or the product identifier. For example, the user identifier and/or the product identifier may be determinable from the avatar request message, in particular, based on user login data, stored user account data, previous user actions, or the like. Furthermore, as stated, the avatar data of one user may be requested by another user—that is, the user who generated the avatar request message may be different from the target user.

The vendor-facing sub-module 516 of the application interface module 502 may facilitate interfacing the digital avatar system 500 with a vendor application, such as the online marketplace servers 118A-M of FIG. 3. The vendor-facing sub-module 516 may receive data from a vendor application as input and may provide data to a vendor application as output. Moreover, the vendor-facing sub-module 516 may facilitate transcoding messages from one format to another format for supporting multiple interface definitions.

In one aspect, the vendor facing sub-module 516 may receive vendor data and/or product data from an online marketplace client device for generating vendor accounts and product records. For example, a vendor application may register an account with the digital avatar server 118N by providing the vendor-facing sub-module 516 account data. Moreover, the vendor application may create one or more product records suitable for providing at least a portion of a digital avatar, as well as defining one or more attributes. Example embodiments of a vendor account and a product record will be described later in greater detail in connection with FIG. 6.

As stated, the third-party-facing sub-module 518 of the application interface module 502 may facilitate interfacing the digital avatar system 500 with third party devices. The third-party-facing sub-module 518 may receive data from third-party applications as inputs and transmit data to the third party application as output. Example of third-party applications may include server and/or client applications that may facilitate generating avatar data, linking data between users, providing data storage, and the like.

The database management module 504 may be a hardware-implemented module which may maintain account and record data, such as user accounts, vendor accounts, and/or product accounts, for facilitating digital avatar services. Accordingly, in the illustrated embodiment, the database management module 504 includes sub-modules 520, 522, 526, for managing respective user account, vendor account, and product record databases. The database management module 504 may interface with one or more data storage devices, such as the database 126 of FIG. 1, to read or write data.

In operation, the database management module 504 may update one or more of the databases based on data received by the application interface module 502. For example, the user-hieing sub-module 514 may provide data to the user database sub-module 520 as an input for creating, updating, or linking user accounts. Likewise, the vendor-facing sub-module 516 may provide data to the vendor database sub-module 522 as an input for creating or updating vendor accounts and/or product records.

Moreover, the database management module 504 may facilitate providing model data for rendering digital avatars by accessing data stored in the user and product databases. For example, in response to an avatar request message, the database management module 504 may select a first user account (or "user record") from the user database. The selection may be based on a user identifier associated with, or included by, the avatar request message. The user account may include measurement data and image data of the corresponding user (collectively forming at least a portion of the user's "avatar data"). Furthermore, the database management module 504 may select a product record from a second database based on the product identifier. The product record may include one or more images for generating, with the user's avatar data, model data of the digital avatar.

Additionally or alternatively, the database management module 504 may facilitate sharing avatar data between users. For example, the application interface module 502 may receive a share request message for requesting that data of a first user account be shared with a second user. For example, the share request message may include a first identifier indicative of a first user record and a second identifier indicative of a second user record.

The database management module 504 may, in turn, provide or write linking data to the second user account. The linking data may facilitate access to the user record of the first user for the second user. In one embodiment, the database management module 504 may access, based on the second identifier, the second user record from the first database. The database management module may also write linking data to the second user record. The linking data, as stated, may provide access privileges to the first user record for the second user. Consequently, a friend or contact of a user may gain access privileges to the user's avatar data.

The graphics processing module 506 may be a hardware-implemented module which may be configured to process image data. For example, the graphics processing module 506 may facilitate determining measurement data of users and/or generating model data for displaying a digital avatar. For example, in one embodiment, the user-facing sub-module 514 may receive one or more images of the users and provide the images to the graphics processing module 506 for processing. In turn, the graphics processing module 506 may determine, with or without user intervention, measurement data of the user based on the one or more images. For example, in one embodiment, the graphics processing module 506 identifies a plurality of points ("POIs") in the images of the user. Based on a reference measurement, such as the user's height, the graphics processing module 506 may determine one or more measurements of the users from the distances between the identified POIs.

As stated, the graphics processing module 506 may also determine or generate model data of the target user and the target product for displaying the digital avatar. For example, the graphics processing module 506 may determine the model data based on the selected user account and the selected product account. The selected user account may provide measurement data of the user, which may be used to select image data of the product record. Furthermore, the selected user account may include image data of the user, such as an image of the user's head and neck. The model data may be based on combining the image data of the selected user accounts and the data of the product record.

The communication interface module 508 may be a hardware-implemented module which may which may facilitate the flow of the information, data, and/or signals between the modules 512. In addition, the communication module 508 can be configured to support communication of the digital avatar system 500 between the servers and client machines of FIG. 1. For instance, the communication interface module 508 may be configured to provide a response message including the model data to display the digital avatar on a user device.

The authentication module 510 may be a hardware-implemented module which may facilitate authentication of data provided from user devices and vendor devices. For example, the authentication module 510 may receive an authentication request message for authenticating a client device. Based on the authentication request message, the authentication module 510 may determine whether the client device passes authentication. The database management module may provide access to the user database in accordance with a determination that the client device passes authentication.

The web-front module 512 may be a hardware-implemented module which may provide data for displaying web resources on client devices. For example, the digital avatar system 500 may provide a webpage for users and vendors to login and create accounts and update the account information. The web-front module 512 may provide user interfaces for users to provide measurement data and manage a personal closet and for vendors to create and manage product records.

Example Data Structures

Figure 6:
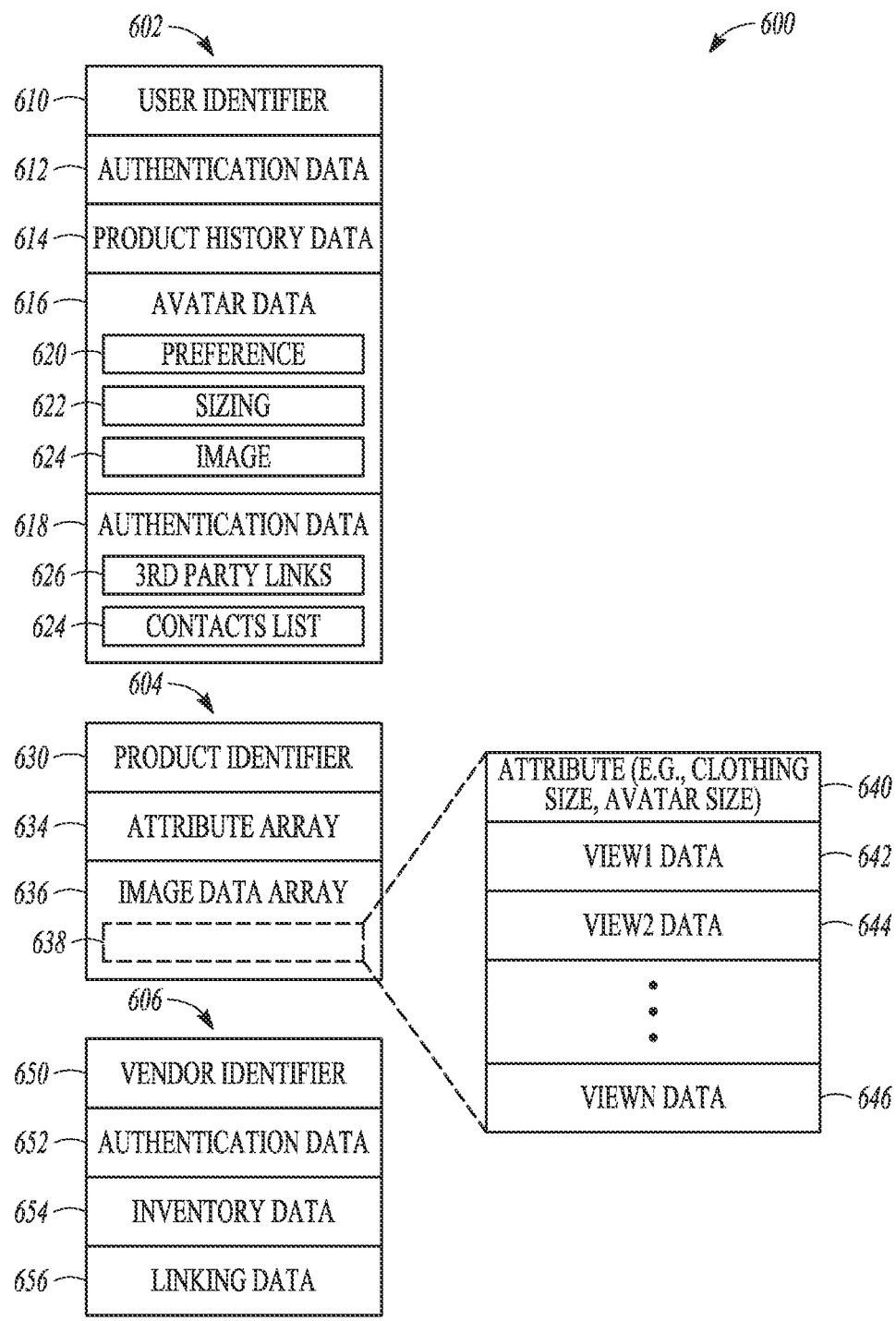
FIG. 6 is a block diagram illustrating example data structures for a digital avatar system, in accordance with an example embodiment.

FIG. 6 is a block diagram illustrating example data structures 602, 604, 606 for a digital avatar system, in accordance with an example embodiment. The data structure 602 may correspond to a data structure of a user account. The data structure 602 may include an authentication data field 612, a product history data field 614, and avatar data field 616, and a linking data field 618. The avatar data field 616 may include a preferences data field 620, a sizing data field 622, and image data field 624. The linking data field 618 may include a third-party links data field 626 and a contacts list data field 628. The data structure 604 may correspond to a data structure of a product record. The data structure 604 may include a product identifier data field 630, an attributes array 634, and an image data array 636. The element 638 of the image data array 636 may include attributes 640, one or more of view data fields 642-646. The data structure 606 may correspond to a vendor account, which may include a vendor identifier data field 650, and authentication data field 652, an inventory data field 654, and a linking data field 656.

In connection with the user account, the user identifier data field 610 may correspond to data usable to identifying a user. For example, each user may have a unique username or code to identify the corresponding user account. In this way, the username or code may be matched to the data field 610 to determine whether or not the data structure 602 corresponds to a particular user. Moreover, the authentication data field 612 may include data for verifying and validating the user. In one embodiment, the authentication data field 612 may correspond to data for determining whether or not a user login data (e.g., a password) matches an expected login data.

The product history data field 614 may include data usable to identify one or more products that the user has purchased or owns. Purchase history may be tracked by online marketplace applications. Products that the owner currently owns may be provided by the user. Furthermore, in some embodiments, the product history data field 614 may also be used to identify one or more products of a wish list or gift list. The product history data field 614 may serve to provide an inventory of products that may be used to configure the user's digital avatar and/or to use to generate recommendations to the user.

The avatar data field 616 may include data that is descriptive of the user. The preferences data field 620 may include attributes. Example attributes may include the user's height, weight, skin color (which may be indicated by a user selection of a color from a palette), age, gender, and the like descriptors. Moreover, the preferences data field 620 may include data corresponding to one or more user preferences, such as whether or not the user prefers certain types of clothing (e.g., shirts, pants, skirts, casual clothing, formal closing, funky clothing, patterns, solids, colors, accessories, or the like). The sizing data field 622 may include measurements of the user. Example measurements may include measurements of (1) the base of the neck to a "shoulder point" (e.g., where the shoulder meets the arm), (2) the shoulder point to an elbow, (3) the elbow to the knuckle of the middle finger, (4) the top of the head to the chin, (5) the base of the neck to the elbow, (6) the width of the chest, (7) the width of the waist, and (8) elbow to the knuckle the middle finger. It will be appreciated that in alternative embodiments more or less measurements may be included. For example, alternative measurements may include measurements related to (1) the top of the belt to just above the sole of the shoe (e.g., the pant length) and (2) the bottom of your crotch to the top of the sole of the shoe (e.g., the pant inseam). The sizing data field 622 may alternatively or additionally include clothing sizes of the user (e.g., as determined from the measurements of the user).

The image data field 624 of the avatar data field 616 may correspond to data indicative of one or more images of the user. As will be described later in greater detail, the user may upload one or more photos of the user and poses in accordance with template poses. For example, the digital avatar system 500 may prompt the user to upload, fir example, three photos in which the user is positioned in different poses. From these three photos, the digital avatar system 500 may determine the sizing data field 622 as described above. Moreover, one or more of the images may be used for the model data to generate a digital avatar. In particular, images of the user face and neck, for example, may be superimposed on "template" bodies wearing the selected products in order to generate a digital avatar.

As stated, the measurement data may be determined in an automatic or semi-automatic way by the digital avatar system 500. In the alternative embodiment, the measurement data may be provided by a third party application via a third-party facing sub-module 518 of the application interface module 502.

The linking data field 618 of the data structure 602 may include data usable to identify one or more users of the digital avatar system 500. For instance, the third-party links 626 may include data indicative of third-party users or systems that may access the user account data structure 602. For example, third party links 626 may include identifiers of stylists who may access the product history data field 614 and/or the avatar data field 616 in order to generate recommendations or make purchases for the user. In alternative embodiments, the third party links data field 626 may include data indicative of social networks that may access data of the data structure 602. Additionally or alternatively, the contacts list 626 may include one or more users connected to the user of the user accounts 602 for facilitating transferring data between the users.

In connection with the product record of the data structure 604, the product identifier data field 630 may correspond to data usable to identifying a product. For example, each product of a vendor may have a unique product name or code to identify the corresponding product record. In this way, the product name or code may be matched to the data field 630 to determine whether or not the data structure 604 corresponds to a particular product. The attributes array 634 may correspond to one or more attributes of the corresponding product. Example attributes may include one or more of material type, sale descriptors, country of origin descriptors, color descriptors, style descriptors, and the like. In one example embodiment, attributes may be given as a pair of attribute name and attribute value. For instance, one example attributes included in the data structure 604 may correspond to the pair (Sale, 30%), wherein the string "Sale" may represent the name of the attribute (e.g., a sale-type attribute) and the value 30% represents the value of the attribute (e.g., the product is on sale at a 30% discount).

The image data array 636 may correspond to one or more data structures that include data for generating model data of a digital avatar. For example, the element 638 of the image data array 636 may include data for rendering a digital avatar of a selected user wearing a selected product. In the illustrated embodiment, the example element 638 may include the attributes data field 640 and one or more view data fields 642-646. The attributes data field 640 may include data that is indicative of attributes or properties shared by the view data field 642-646. Example of attributes or properties of the attributes data field 640 include size data of the product, sized data of the digital avatar wearing the product, product variation (e.g., color), and the like. Different elements of the image data array may correspond to different variations of the product model.

The one or more view data fields 642-646 may include data for rendering one or more versions of a digital avatar wearing the corresponding product. For example, the view1 data field 642 may correspond to a front facing view of the avatar rendered product, view2 data field 644 may correspond to a side facing view of the avatar rendered product, and so on.

In connection with the vendor account of the data structure 606, the vendor identifier data field 650 may correspond to data usable to identifying a vendor. For example, each vendor may have a unique vendor name or code to identify the corresponding vendor account. In this way, the vendor name or code may be matched to the data field 650 to determine whether or not the data structure 606 corresponds to a particular vendor. Moreover, the authentication data field 652 may include data for verifying and validating the vendor. In one embodiment, the authentication data field 652 may correspond to data for determining whether or not vendor login data (e.g., a vendor name and password pair) matches the expected login data.

The inventory data field 654 may correspond to data indicative of the product records associated with the corresponding vendor. For example, the inventory data field 654 may be an array of product records, or pointers to product records, in accordance with data structures 604. The linking data field 656 may correspond to data indicative of users and/or third parties linked to the corresponding vendor. For example, users may connect to the vendor account via a social network or through the vendor's or the digital avatar system's website. Third parties may connect to the vendor account through the vendor's or the digital avatar system's website in order to provide or receive digital avatar services.

Example User Interface

FIGS. 7-13 are interface diagrams illustrating example user interfaces with multiple display elements delivered to a client device for managing user accounts, according to example embodiments. As illustrated in FIGS. 7-13, the user interfaces may be presented to a user on the display of a client device (e.g., client device 110). In particular, the user interface 700 may be rendered on the display 210 of the mobile device of FIG. 2. The display 210 may correspond to a touch sensitive liquid crystal display (LCD) which the user may select elements of the user interface 700 by touching the display 210. Moreover, the user may utilize the I/O devices 212 of the mobile device 200 to navigate to a previous user interface. Although FIGS. 7-13 will be described in the context of user interfaces displayed on a mobile phone, it will be appreciated that the user interfaces may be displayed on other types of devices such as a desktop computer, laptop computer, or mobile computing device connected to the network 104.

Figures 7, 8:
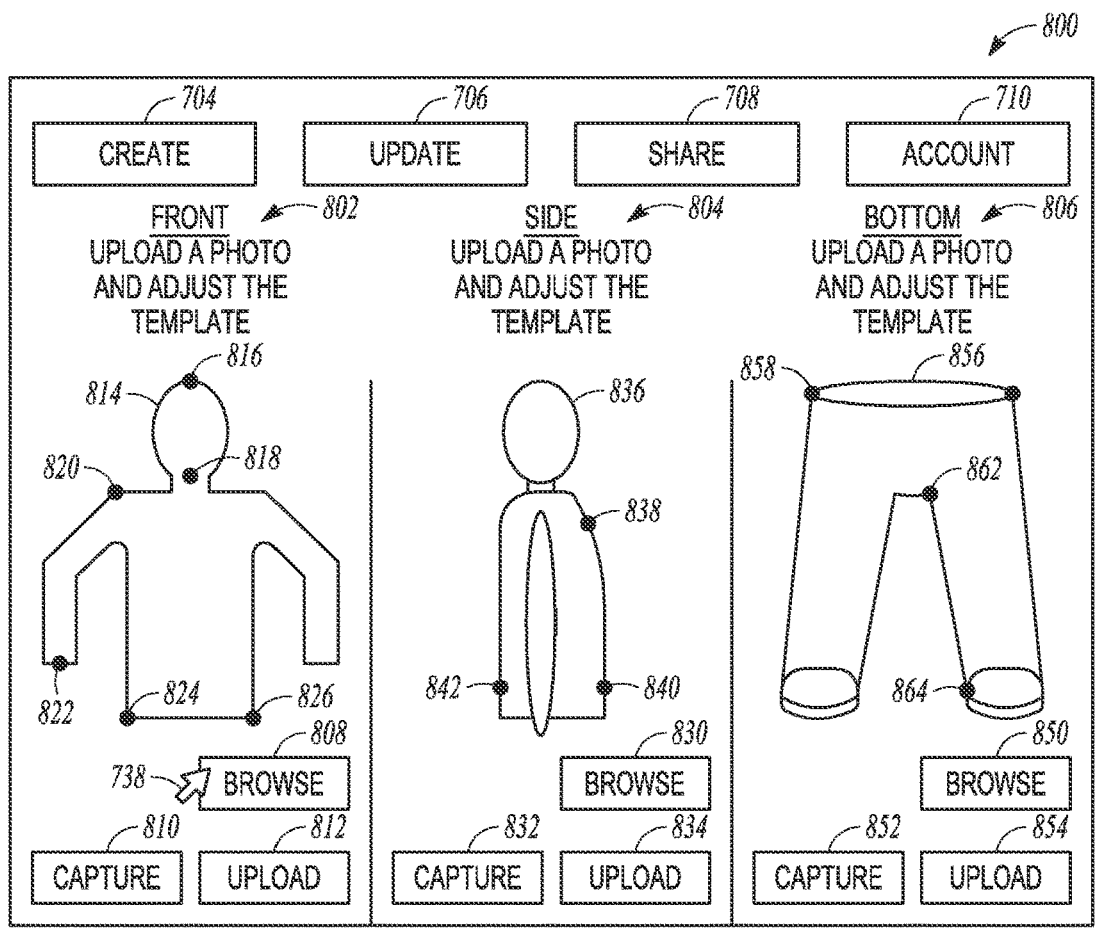
FIGS. 7-13 are interface diagrams illustrating example user interfaces with multiple display elements delivered to a client device for managing user accounts, according to example embodiments.

In the illustrated example embodiment of FIG. 7, the user interface 700 corresponds to a graphical user interface of a webpage or software application executing on the client device that allows the user to initiate a process to create a user account, such as an account corresponding to the data structure 602 of FIG. 6. In one example embodiment, the user interface 700 may correspond to the display of a webpage provided by the digital avatar system 500 of FIG. 5.

Figure 9:
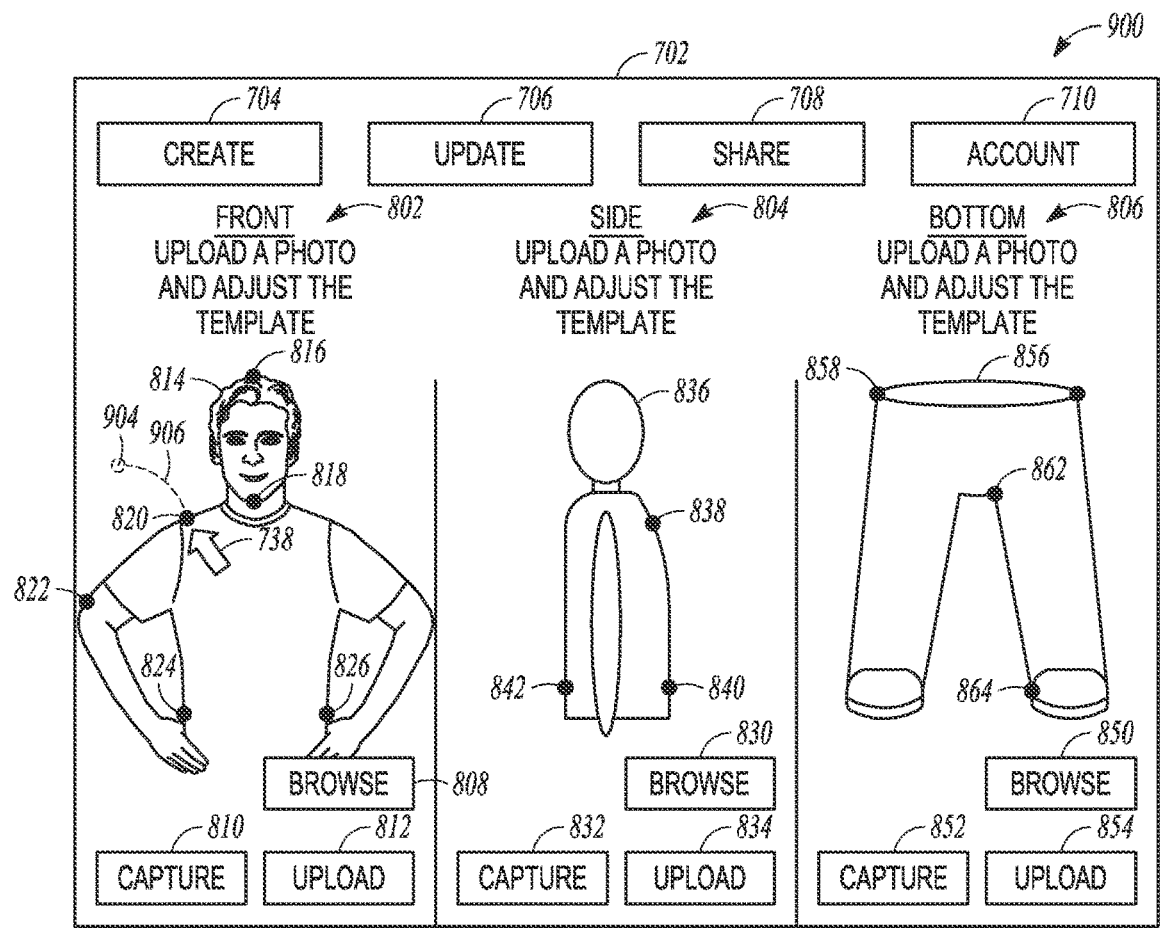
Figure 10:
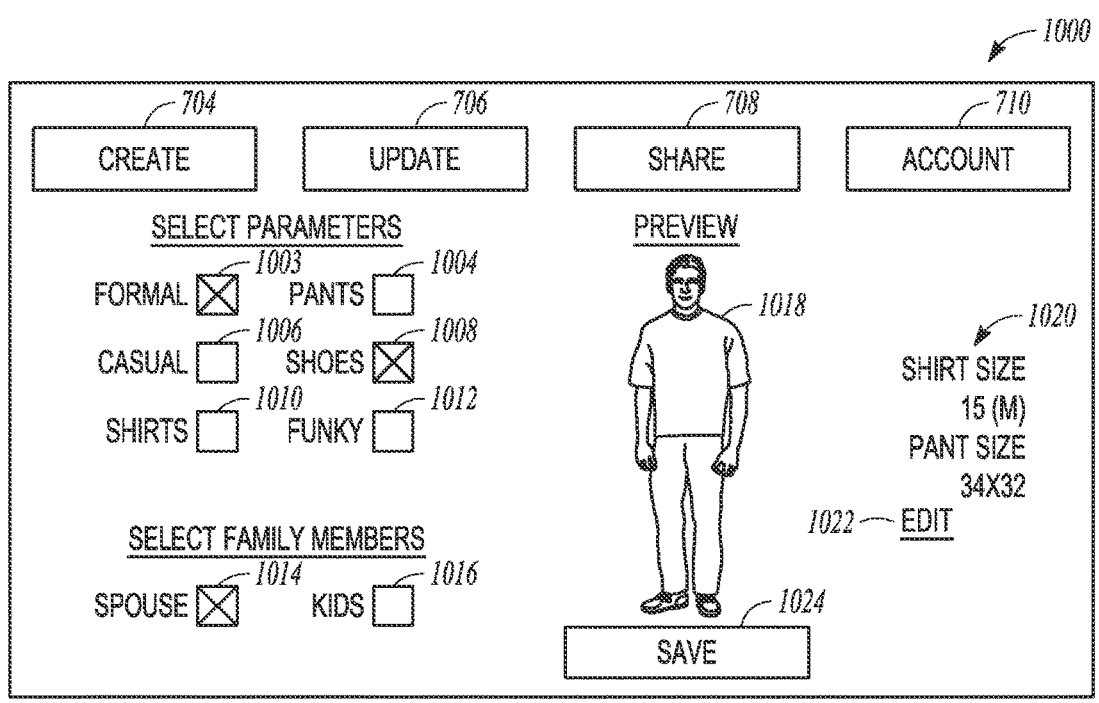

The user interface 700 includes a frame 702, which may include user interface elements 704-736, and a pointer 738 to interact with the elements 704-730. The user interface elements 704, 706, 708, 710 may correspond to display elements or control elements associated with functions of a digital avatar website or application. For example, in the illustrated example, the elements 704, 706, 708, 710 indicate that the user interface is for creating a user account (e.g., element 704), updating a user account (e.g., element 706), sharing a user account (e.g., element 708), and managing account information (e.g., element 710). In operation, a graphical indication may indicate which one of the elements 704-710 is active. For example, the element 704 of FIG. 7 is highlighted to indicate that the user interface 700 corresponds to an interface for creating a user account. FIGS. 8, 9, and 10 show additional user interfaces that may be used in connection with creating a user account. User interfaces for updating a user account (e.g., in connection with element 706) may be similar to the user interfaces 700-1000. Moreover, user interfaces for the functions corresponding to elements 708, 710 will be described later in greater detail in connection with FIGS. 11 and 13. If the elements 704-710 correspond to control elements, then the user may select one of the control elements 704-710 to switch to another function.

The elements 712-720 may receive user input that is indicative of personal information to configure the user's account. For example, in the illustrated embodiment, the user may input the user's name, an email address, a mailing address, a phone number, and a password in respective text boxes. One or more of the elements 712-720 may be designated as being required input (e.g., such as the user's name, email, address, and password; as indicated by an asterisks) or optional input (e.g., phone #). In an alternative embodiment, more or less information may be provided and more or less information may be required input.

The elements 722, 724 may receive user input that is indicative of the user's gender. For example, in operation, the user may position the pointer 738 over a selected one of the elements 722, 724 to select male or female. The element 726 may correspond to a control element for receiving user input that is indicative of the user's age. In the illustrated embodiment, the control element 726 may correspond to a drop-down menu for selecting the range of ages. In alternative embodiments, the control element 726 may instead correspond to a text box in which the user may provide user input that is indicative of the user's age or date of birth. The elements 728, 730 may receive user input that is indicative of the user's height. The element 734 may receive user input that is indicative of the user's weight. The element 736 may receive user input that is indicative of a request to accept the user input received by the element 712-734 and to proceed to the next user interface.

Although the elements 712-736 are shown as corresponding to various types of user interface elements—such as, but are not limited to, text boxes, drop-down menus, and/or buttons—it will be appreciated that in alternative embodiments that the elements 712-736 may be any suitable type of user interface element for receiving the corresponding user input.

FIG. 8 illustrates an example user interface 800 of a webpage or software application executing on a client device (e.g., client device 110 of FIG. 1) which may facilitate providing user measurement data as part of the process of creating a user account, such as an account corresponding to the data structure 602 of FIG. 6. In one example embodiment, the user interface 800 may correspond to a user interface provided by the digital avatar system 500 of FIG. 5 in response to a user selecting interface element 736 of FIG. 7. Elements common to the interfaces of FIGS. 7 and 8 share common reference indicia, and only differences between the interfaces are described herein for the sake of brevity.

In the illustrated embodiment of the user interface 800, the frame 702 may include elements 704-710 and sub-frames 802, 804, 806. The sub-frame 802 may include user interface elements 808-826. The sub-frame 804 may include user interface elements 830-842. The sub-frame 806 may include user interface elements 850-864.

The sub-frames 802, 804, 806 may receive user inputs for determining measurements of the user and/or image data of the user. The user inputs may correspond to one or more images of the user, for example, posed in accordance respective templates. For example, the sub-frame 802 may prompt the user to provide a first image of the user facing the camera and posed as shown by template 814. In an alternative embodiment, the template may include a full-body view. The sub-frame 804 may prompt the user to provide a second photo of the user showing a side view of the user in accordance with template 835. The sub-frame 806 may prompt the user to provide a third photo of the user showing a waist-down view of the user in accordance with template 855. To facilitate providing the images, the user interface 800 may provide elements 808, 830, 850 for browsing a file system for a file to be uploaded to the digital avatar system 500.

Additionally or alternatively, the user interface 800 may provide elements 810, 832, 852 for capturing a new image of the user in order to provide image data for the respective sub-frames 802, 804, 806. For example, in response the user selecting the capture element 810, a camera may be activated for capturing images or a video of the user, and the images or video may be displayed in the sub-frame 802 in substantially real time and with the template 814 superimposed on the images or video. The user may then position the user's body to substantially match the template 814, and an image from the images or video may be captured either automatically (e.g., detecting the user's pose matching the template 814) or in response to a user input (e.g., by a voice command or by selecting the capture button 810 a second time). As such, the interface 800 may provide integrated image capturing capabilities. The capture elements 832, 852 may be configured in a similar way.

In operation, once images have been provided to the sub-frames 802, 804, 806, one or more points (POIs) may be placed on the images for determining measurements. For example, sub-frame 802 includes points 816-826 to be positioned on the front-view image of the user. The template 836 of the sub-frame 804 includes POIs 838-842 to be positioned on the side view image of the user. The template 856 of the sub-frame 806 includes points 858-864 to be positioned on the bottom-view image of the user. The distances between POIs and a reference measurement (the user's height and/or weight) may be indicative of one or more measurements of the user that are suitable for generating a digital avatar model. Positioning of the POIs will be described in greater detail later in connection with FIG. 9.

Additionally or alternatively, the user interface 800 may provide elements 812, 834, 854 for uploading the images provided to the sub-frames 802, 804, 806, respectively. For example, in operation, the user may select the upload element 812 after a front-view image has been selected and the POIs 816-826 have been positioned. When the image is uploaded, the digital avatar system 500 may determine measurements based on the distances between points 816-826. The upload elements 834, 854 may be configured in a similar way.

FIG. 9 illustrates an example user interface 900 of a webpage or software application executing on a client device (e.g., client device 110 of FIG. 1) which may facilitate providing user measurement data as part of the process of creating a user account, such as an account corresponding to the data structure 602 of FIG. 6. The user interface 900 may correspond to the user interface 800 of FIG. 8 in response to the user uploading an image to the sub-frame 802. Elements common to the interfaces of FIGS. 7, 8, and 9 share common reference indicia, and only differences between the interfaces are described herein for the sake of brevity.

In the illustrated embodiment of the user interface 900, the sub-frame 802 may include an image 902 of the user posed in accordance with the template 814 of FIG. 8. As stated, the image may have been provided by the user by the user selecting the browse element 808 or the capture element 810. In operation, the user may select the POIs 816-826 for positioning the points on the image 902 of the user. For example, the illustrated embodiment shows that the user has selected the point 820 and has moved the point 820 from an initial position 904 along a path 906 to a shoulder point of the image. After the POIs 816-826 have been positioned, the user may select the upload element 812 for providing to the digital avatar system 500 the image 902 and the positions of the points 816-826 relative to the image 902.

FIG. 10 illustrates an example user interface 1000 of a webpage or software application executing on a client device (e.g., client device 110 of FIG. 1) which may facilitate saving user account data as part of the process of creating a user account, such as an account corresponding to the data structure 602 of FIG. 6. The user interface 1000 may correspond to a user interface provided by the digital avatar system 500 in response to the user completing uploading images to the sub-frames 802, 804, 806 of FIG. 8. Elements common to the interfaces of FIGS. 7 and 10 share common reference indicia, and only differences between the interfaces are described herein for the sake of brevity.

In the illustrated embodiment of the user interface 1000, the frame 1002 includes elements 1003-1024 for receiving user inputs that are indicative of user attributes and saving to the use account. For example, the elements 1003-1012 may receive user inputs that are indicative of one or more attributes to be applied to the user account. The attributes may correspond to preferences of the user. For example, in the illustrated embodiment, the user may select one or more categories indicating that the user prefers formal clothing 1003, pants 1004, casual clothing 1006, shoes 1008, shirts 1010, and/or funky clothing 1012.

Additionally or alternatively, the elements 1014, 1016 may receive user inputs that are indicative of relationships with other users. In the illustrated embodiment, for example, the element 1014 of the frame 1002 may receive user input for indicating that the user account and the user account of the user's spouse should be linked. Moreover, the element 1016 of the frame 1002 may receive user input for indicating that the user account and the user account of the user's children should be linked.

The frame 1002 may also display a preview of the digital avatar 1018 for confirmation and/or adjustment. As stated, the preview of the digital avatar 1018 may be generated by the digital avatar system 500 based on the distances between a plurality of points of one or more images of the user, as was described above in connection with FIG. 7-9. Moreover, the frame 1002 may display a preview of the size information determined by the digital avatar system 500. For example, in the illustrated embodiment, the elements 1020 displays the shirt size and pant size of the user as determined by the digital avatar system 500. The element 1022 may receive user input for editing the avatar preview 1018 or the size information 1020. The element 1024 may receive user input for saving the avatar data to the user account.

Figure 11:
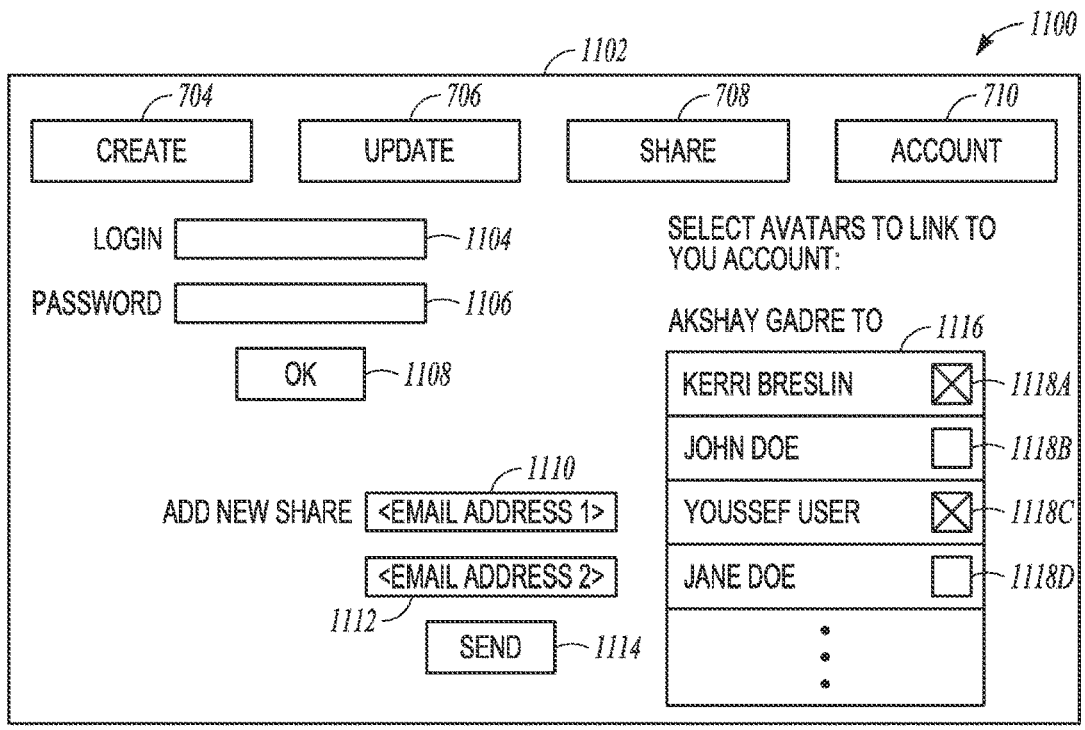

FIG. 11 illustrates an example user interface 1100 of a webpage or software application executing on a client device (e.g., client device 110 of FIG. 1) which may facilitate sharing user accounts, such as accounts corresponding to the data structure 602 of FIG. 6. The user interface 1100 may include a frame 1102 having elements 704-710 and elements 1104-1116. Moreover, the element 1116 may correspond to a table comprising one or more rows 1118A-D. Elements common to the interfaces of FIGS. 7 and 11 share common reference indicia, and only differences between the interfaces are described herein for the sake of brevity.

The elements 1104,1106 may receive user input that corresponds to login data for accessing a user account. For example, the user interface 1100 may receive user inputs indicative of a username and a password via the login element 1104 in the password element 1106, respectively. Selection of the element 1108 may cause the user interface to provide the login and password data to the digital avatar system 500 for authentication. If authentication is successful, the digital avatar system 500 may send user interface data to activate elements 1110-1116.

The elements 1110, 1112 may facilitate sharing user account data between users. For example the elements 1110, 1112 may receive user input is indicative of one or more email addresses of other users. If the element 1114 receives user input that corresponds to a user selection of element 1114, the user interface 1100 may transmit the email address data to the digital avatar system 500 for linking the user account with the user accounts associated with the email addresses. In an example, linking the user account includes providing the user's associated with the email addresses access to the user account. In another example, linking the user account includes sending the user's associated with the email addresses a notification requesting permission for the user to access their user accounts.

The element 1116 of the frame 1102 may correspond to a table of one or more entries, each entry corresponding to a contact of the user. The context may correspond to contacts to whom the user has sent share requests via elements 1110, 1112, 1114 and/or contacts who have sent share requests to the user. Furthermore, the entries of the element 1116 may include respective user interface elements 1118A-D for receiving user input that is indicative of the user activating or deactivating the corresponding entry. Deactivating an entry of the element 1116 may correspond to disabling sharing with the corresponding contact (e.g., temporarily preventing access to user account data), and activating an entry of the element 1116 may correspond to enabling sharing with the corresponding contact (e.g., allowing access to user account data). In this way, the user may dynamically manage shared contacts.

Figure 12:
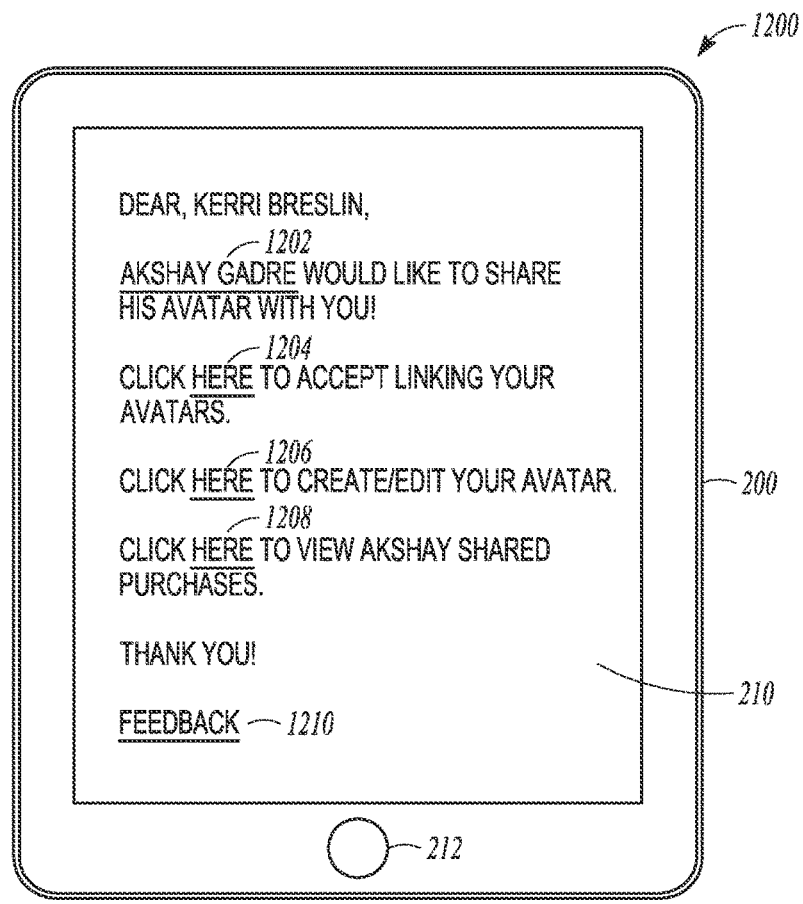

FIG. 12 illustrates an example user interface 1200 of a webpage or software application rendered on a client device (e.g., mobile phone 200 of FIG. 2 or any client device 110 of FIG. 1) which may display a share request for a user. The user interface 1200 may correspond to a notification sent to the mobile phone 200 in response to another user transmitting a share request. The notification may include one or more selectable elements, such as hyperlinks 1202-1210, for facilitating responses to the notification. The hyperlink 1202 may correspond to a link to a profile page of the requesting user ("Akshay Gadre"). The hyperlink 1204 may correspond to a link for accepting the share request. The hyperlink 1206 may correspond to a link for creating or editing the user's account. The hyperlink 1208 may correspond to a link for viewing shared purchases of the share request recipient and the share request sender. The hyperlink 1210 may correspond to a link to provide feedback to the digital avatar system 500.

Figure 13:
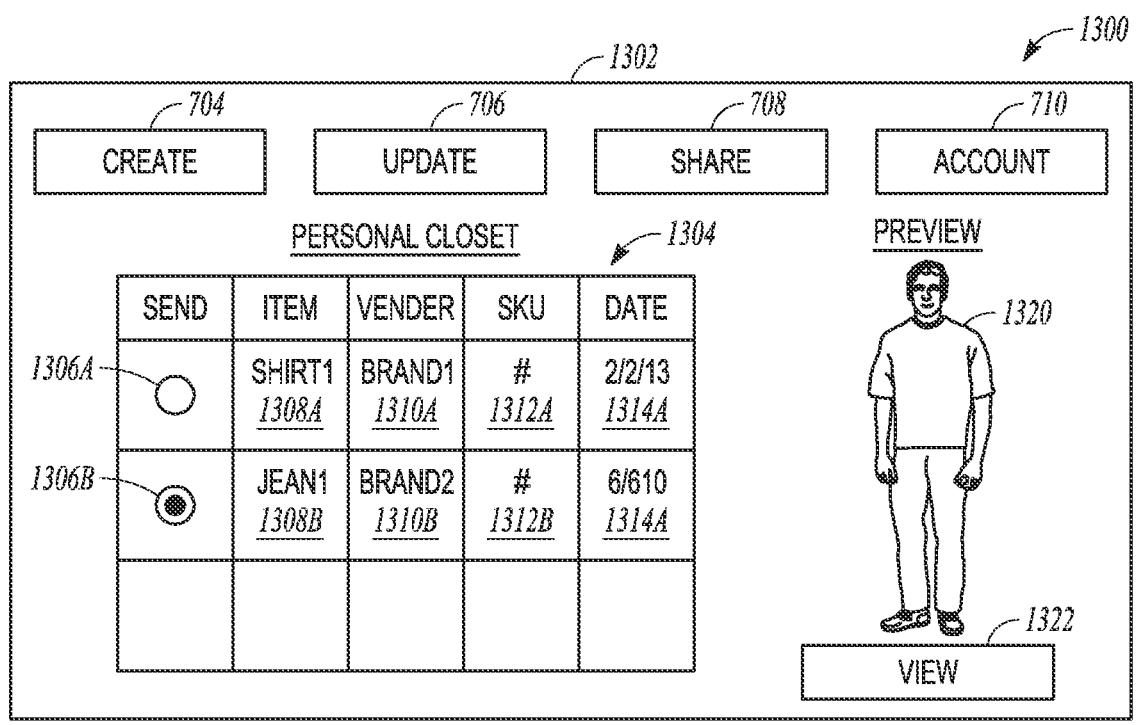

FIG. 13 illustrates an example user interface 13 of a webpage or software application to be rendered on a client device (e.g., client device 110 of FIG. 1) which may facilitate managing a user account, such as an account corresponding to the data structure 602 of FIG. 6. The user interface 1300 may include a frame 1302 having elements 704-710 and elements 1304 corresponding to a table of one or more rows formed by elements 1306A-1314A, 1306B-1314B. The frame 1302 may further include display element 1320 and a control element 1322.

The element 1304 may correspond to a personal closet of the user. The personal closet may include products that the user has purchased using the digital avatar system 500 and/or products that have been entered into the digital avatar system 500. Each product may have a corresponding row. For example, the row including the elements 1306A-1314A may represent a first product corresponding to a shirt, and the row including the elements 1306B-1314B may represent a second product corresponding to a pair of jeans. The elements 1306A,1306B may receive user input that is indicative of selecting the corresponding product. The elements 1308A, 1308B may display text that describes the corresponding product. The elements 1310A, 1310B may provide text that is indicative of the vendor of the corresponding product. The element 1312A, 1312B may provide text that is indicative of an identification number (e.g., stock keeping unit (SKU) number) of the corresponding product. The elements 1314A, 1314B may provide text that is indicative of the date on which the corresponding product was purchased or entered into the digital avatar system 500.

The display element 1320 of the frame 1302 may correspond to a preview of the digital avatar wearing the selected products from the table 1304 in accordance with the selection of the elements 1304A, 1304B and in response to the user selecting the control element 1322.

FIGS. 14-19 are interface diagrams illustrating example user interfaces with multiple display elements delivered to a client device for utilizing digital avatars, according to example embodiments. In particular, the user interfaces of FIGS. 14-19 may be provided by online marketplace servers, such as the marketplace application 120 of FIG. 1. The online marketplace servers may provide the user interfaces as part of the retailer's or vendor's website or application. Digital avatars may be displayed as part of the website or application to improve the user's shopping experience. Elements common to the user interfaces of FIGS. 14-19 share common reference indicia, and only differences between the user interfaces are described herein for the sake of brevity.

Figure 14:
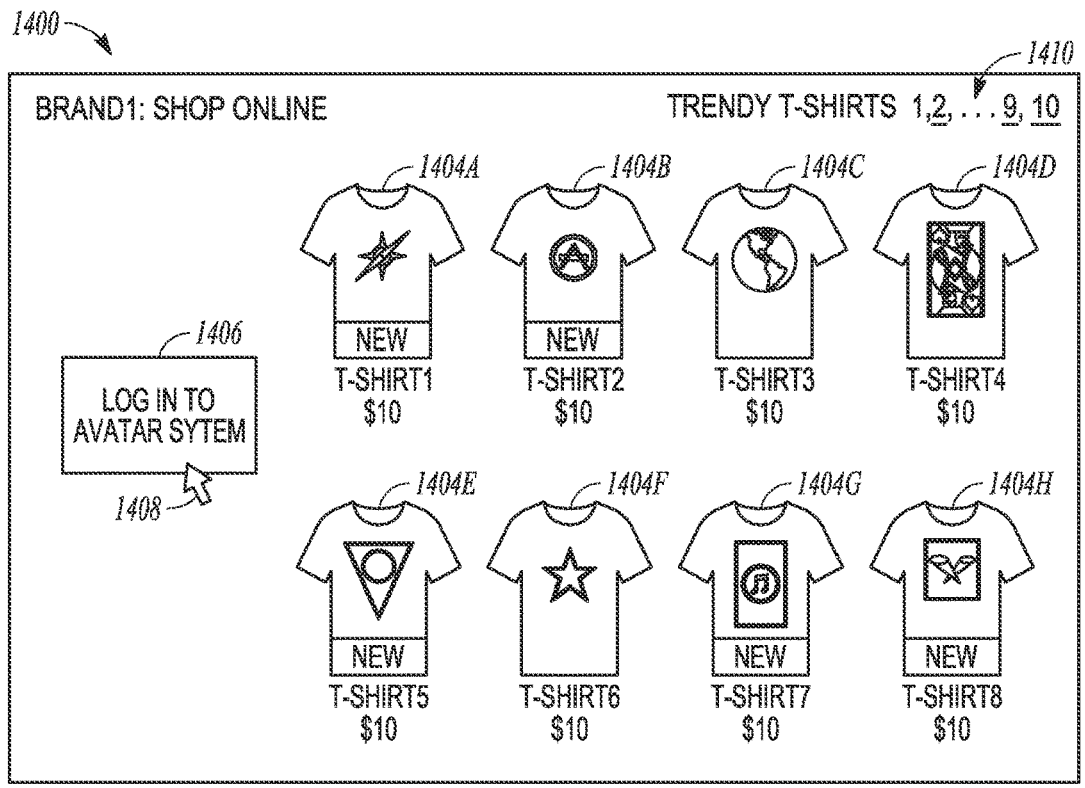
FIGS. 14-19 are interface diagrams illustrating example user interfaces with multiple display elements delivered to a client device for utilizing digital avatars, according to example embodiments.

FIG. 14 illustrates an example user interface 1400 of a webpage or software application of an online marketplace to be rendered on a client device client device 110 of FIG. 1). The user interface 1400 may include a frame 1402 having elements 1404A-1404H, 1406, 1408, 1410. The elements 1404A-1404H of the illustrated embodiment may correspond to various products (e.g., shirts) for purchase. The element 1406 may correspond to a button that is selectable for logging into the digital avatar system 500. The element 1408 may correspond to a pointer of an input device. The element 410 may correspond to control elements used to navigate between a plurality of pages displaying products of the online marketplace.

Figure 15:
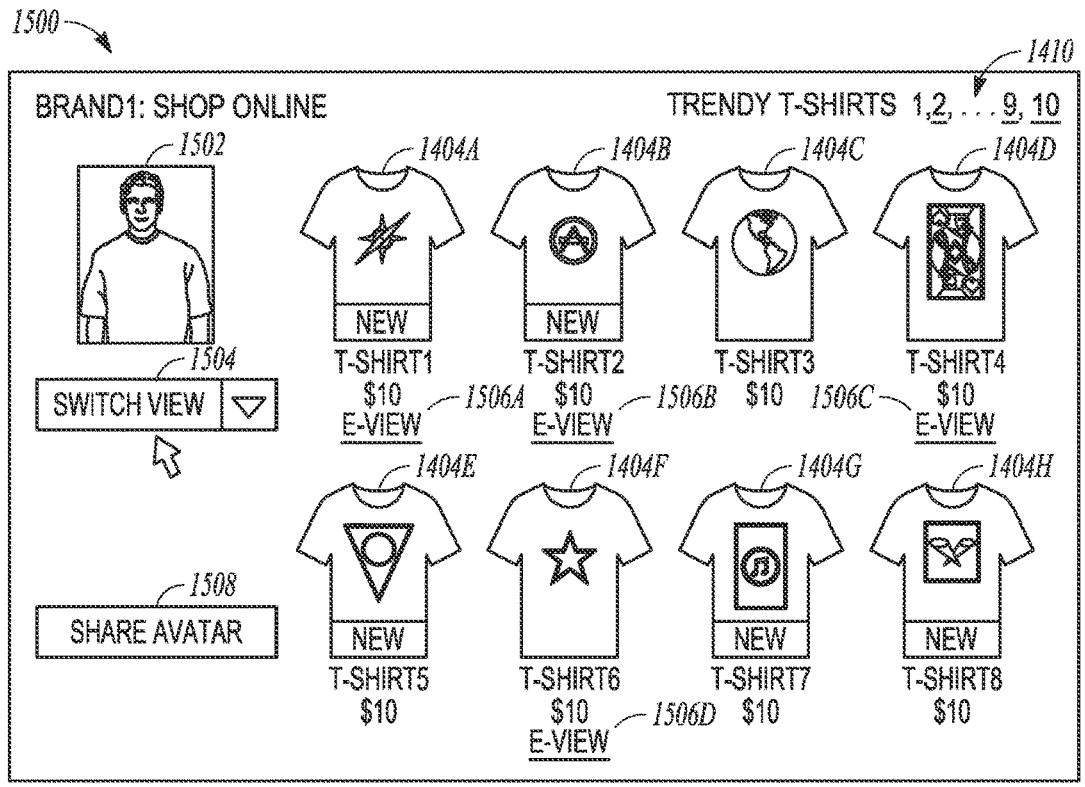

FIG. 15 illustrates an example user interface 1500 of a webpage or software application of an online marketplace to be rendered on a client device (e.g., client device 110 of FIG. 1). The user interface 1500 may correspond to a user interface provided by the digital avatar system 500 in response to a user selection of the element 1408 of FIG. 14 and successful authentication. In particular, after the user successfully logs into the digital avatar system 500, the user interface 1500 displays elements 1502, 1504, 1506A-F, 1508. The element 1502 may correspond to a display element for displaying the user's digital avatar. In the illustrated embodiment of FIG. 5, the digital avatar is shown in a default configuration (e.g., blank shirt). The element 1504 may correspond to a selectable button or pull-down menu for changing the element 1502 to a different user. The elements 1506A-F may correspond to selectable control elements for configuring the digital avatar displayed in element 1502, as will be described in greater detail below in connection with FIG. 16. As shown, not all products of the online marketplace may support digital avatar views (e.g., the products of elements 1404E, G, H). The element 1508 may correspond to a selectable button for sharing the digital avatar displayed in element 1502 with another user or to post to a social network for commenting.

Figure 16:
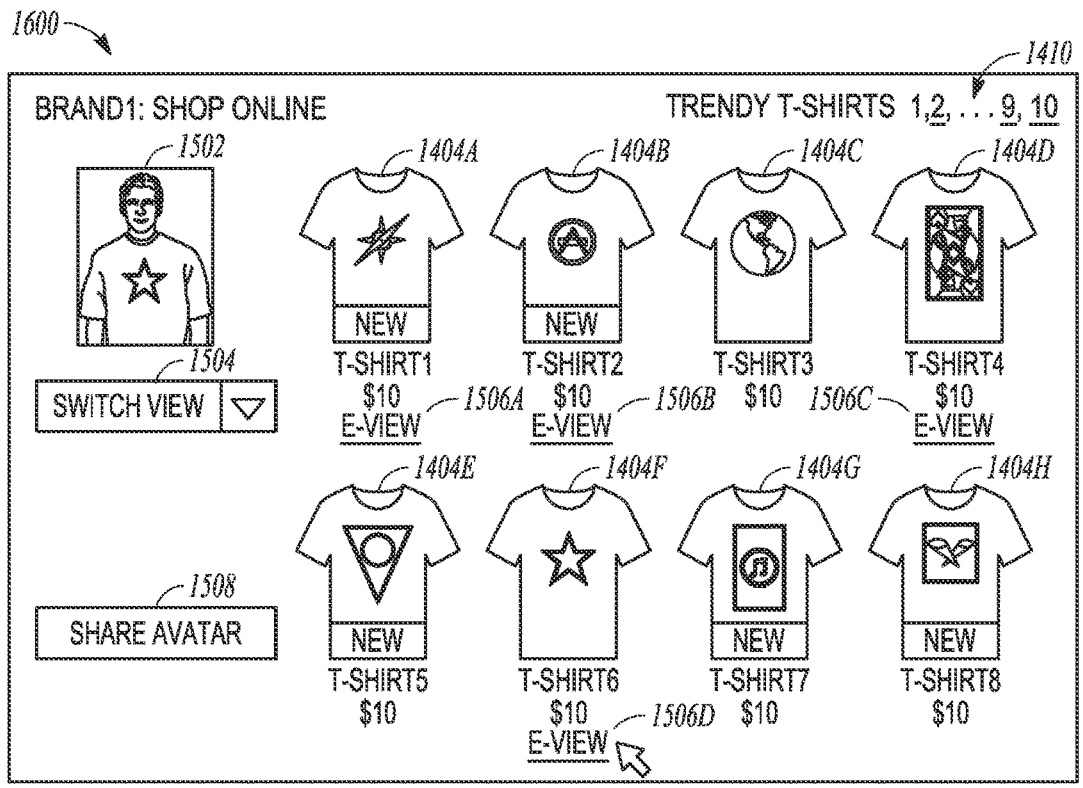

FIG. 16 illustrates an example user interface 1600 of a webpage or software application of an online marketplace to be rendered on a client device (e.g., client device 110 of FIG. 1). The user interface 1600 may correspond to a user interface provided by the digital avatar system 500 in response to a user selection of the element 1506F of FIG. 15. In particular, in accordance with a user selection of the element 1506F, the element 1502 displays the digital avatar of the user as wearing the shirt corresponding to the element 1506F. The user may then select one of the elements 1506A-1506F to change the shirt of the digital avatar again.

Figure 17:
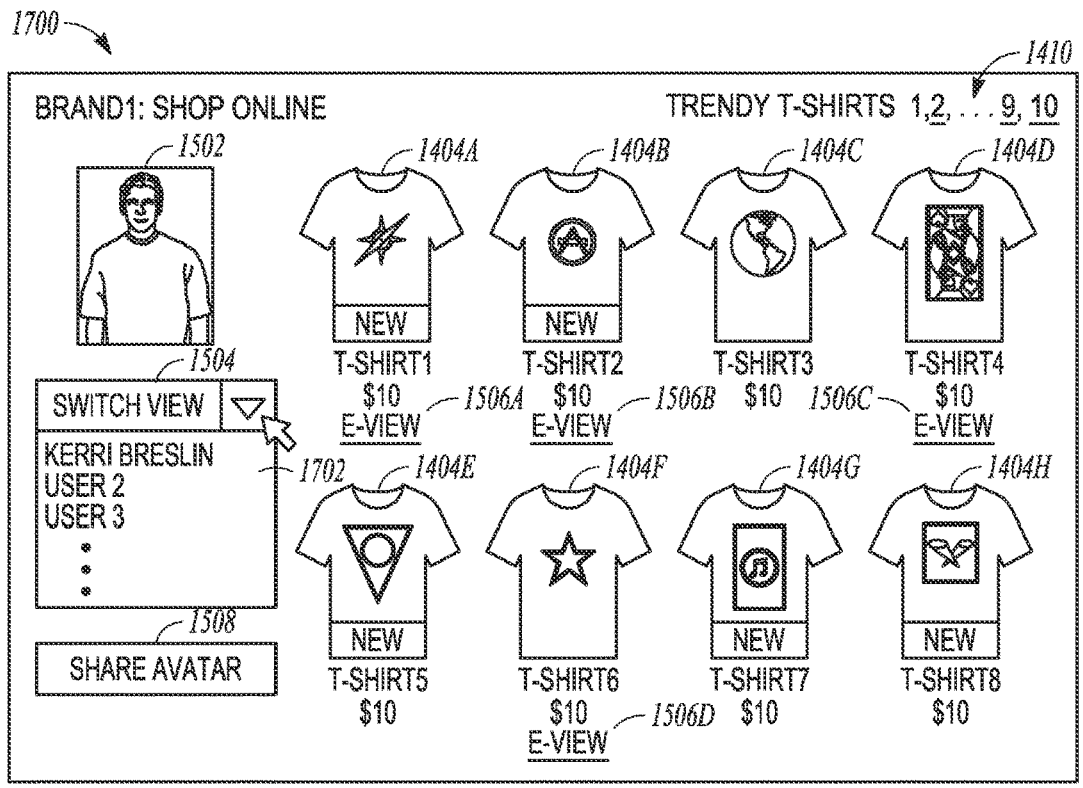

FIG. 17 illustrates an example user interface 1700 of a webpage or software application of an online marketplace to be rendered on a client device (e.g., client device 110 of FIG. 1). The user interface 1700 may correspond to a user interface provided by the digital avatar system 500 in response to a user selection of the element 1504 of FIG. 15. In particular, in accordance with a user selection of the element 1504, the element 1504 displays a list of contacts who shared their digital avatars with the user. Accordingly the user may select a contact that is listed in element 1702 in order to use the selected contact's avatar, as shown below in connection with FIGS. 18 and 19.

Figure 18:
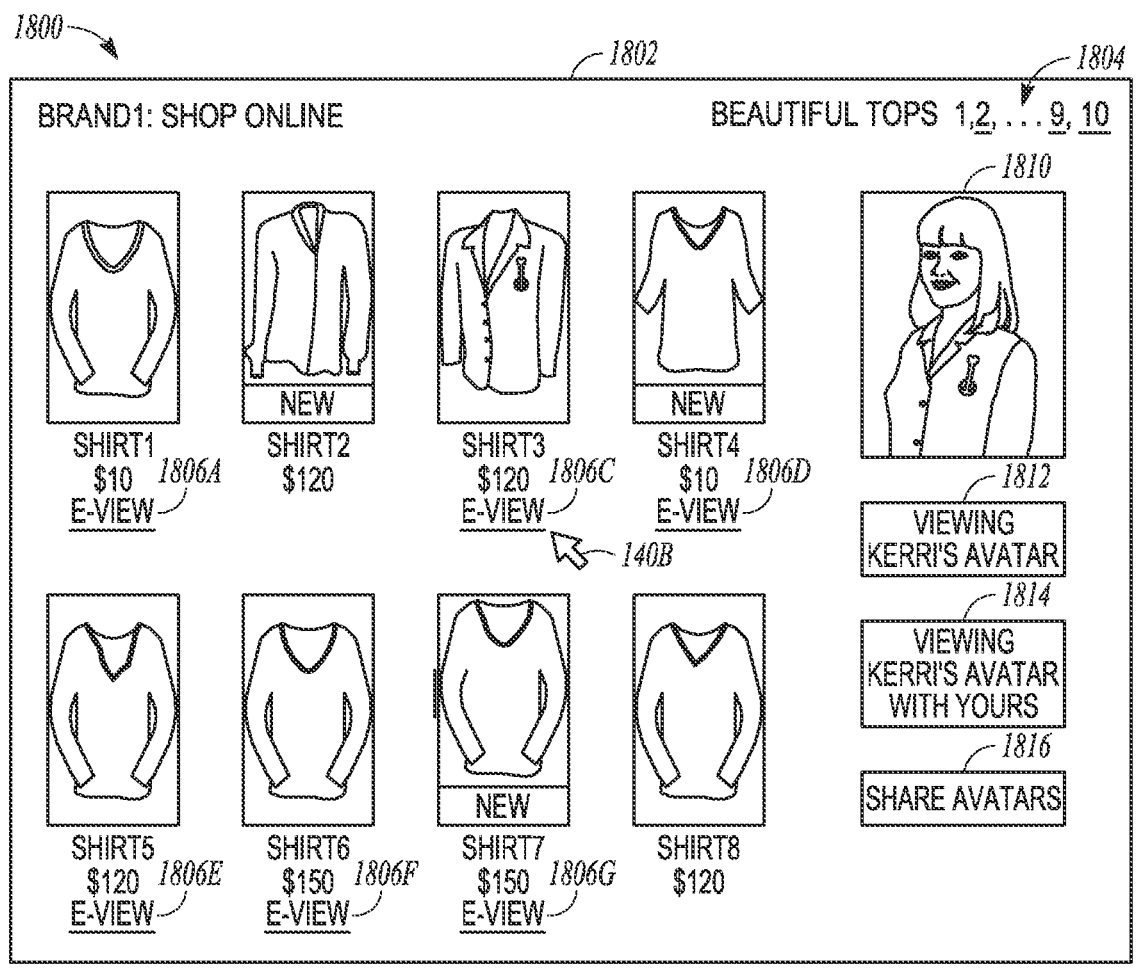

FIG. 18 illustrates an example user interface 1800 of a webpage or software application of an online marketplace to be rendered on a client device (e.g., client device 110 of FIG. 1). The user interface 1800 may correspond to a user interface provided by the digital avatar system 500 in response to a user selection the contact "Kerri Breslin" from the element 1702 of FIG. 17. In particular, the user interface 1800 includes a frame 1802 comprising elements 1804A-H for displaying products and elements 1806A-G for configuring a digital avatar of the contact with the corresponding products. The frame 1802 may further include a group of elements 1808 for navigating to different product pages. An element 1810 of the frame 1802 may display the digital avatar of the contact in accordance with user selections of elements 1806A-G. For example, the digital avatar displayed in element 1810 is shown as wearing the product corresponding to the element 1806C selected by the pointer 1408. An element 1812 of the frame 1802 may display the user name of the contact currently being displayed. An element 1814 of the frame 1802 may be selected for adding the current user's avatar with the contact's avatar. An element 1816 of the frame 1802 may be selected for sharing the avatars being displayed.

Figure 19:
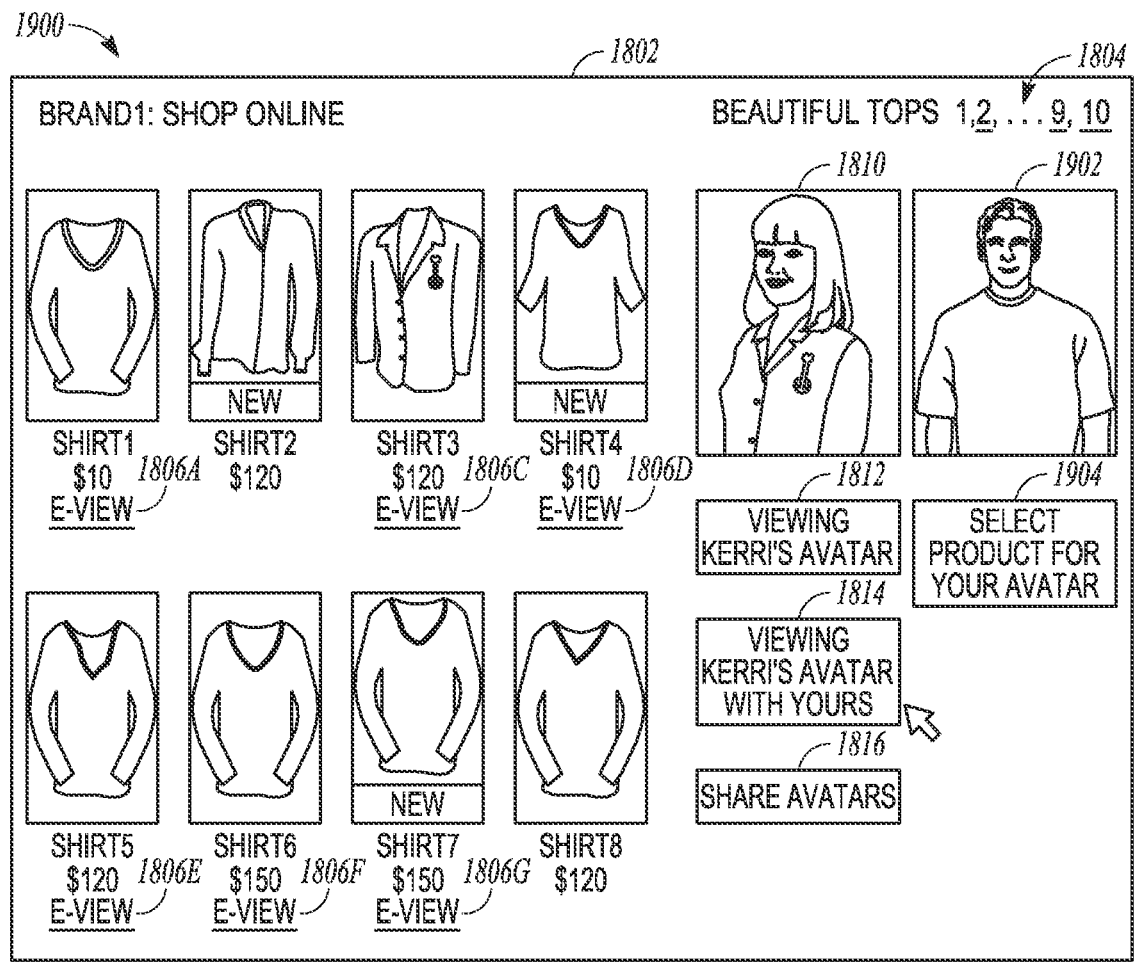

FIG. 19 illustrates an example user interface 1900 of a webpage or software application of an online marketplace to be rendered on a client device (e.g., client device 110 of FIG. 1). The user interface 1900 may correspond to a user interface provided by the digital avatar system 500 in response to a user selection the element 1814 of FIG. 18 for viewing the user's avatar and the contact's avatar together. In particular, the user interface 1900 includes the display element 1902 for displaying the digital avatar of the user. Furthermore, the user interface 1902 includes the element 1904, which may correspond to a selectable button for selecting to configure the user's avatar. For example, after selecting the element 1904, selecting "e-view" link element cause the display element 1902 to display the corresponding product on the user's avatar instead of the contact's avatar of display element 1810.

Figure 20:
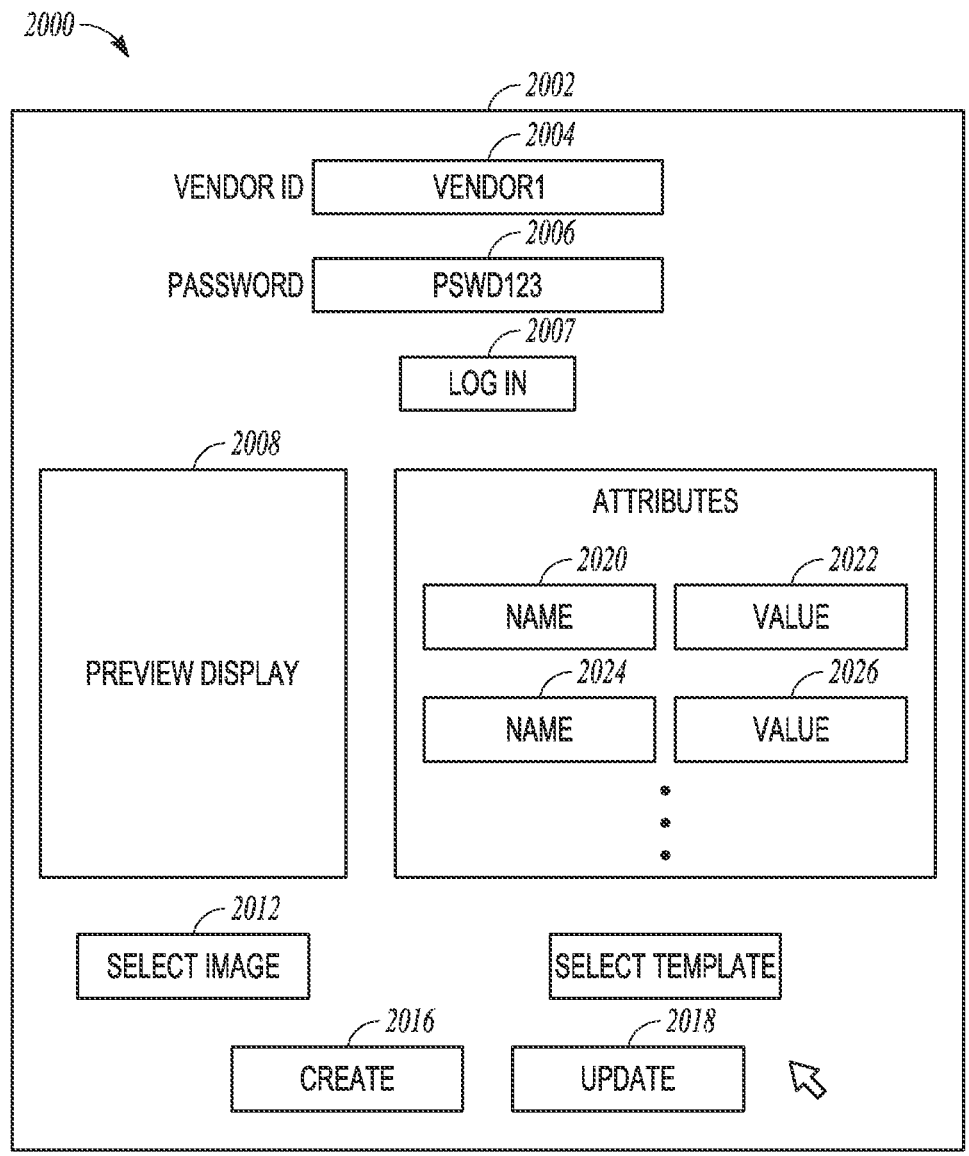
FIG. 20 is an interface diagram illustrating an example user interface with multiple display elements delivered to a client device for providing product records, according to example embodiments.

FIG. 20 is an interface diagram illustrating an example user interface 2000 with multiple display elements delivered to a client device for providing product records, according to example embodiments. For example, a user of an online marketplace server 118 of FIG. 3 may provide user input to create a product record of a vendor account stored by the digital avatar server 118N using the database 126N. The user interface 2000 may include a frame 2002 which has elements 2004-2018. The element 2010 may correspond to a table having one or more entries, such as a pair of elements 2020, 2022 forming one entry and a pair of element 2024, 2026 forming another entry.

In the illustrated embodiment, the elements 2004, 2006 may correspond to text boxes for receiving user input (e.g., username and password) for logging into the digital avatar system 500. The element 2007 may correspond to a button that is selectable for initiating an authentication process based on the user input received by the elements 2004, 2006. Upon a successful authentication, the user (e.g., a vendor) may access the elements 2008 through 2022 for creating a product record for the vendor account of the user.

The element 2008 may correspond to a display element for rendering a preview image of the avatar version of the product. The preview image may be selected in response to a user selection of element 2012, which may correspond to a selectable button for browsing a file hierarchy for a selected image file. Upon selection, the image file displayed in the preview display element 2008. The image may correspond to a view of the product in a specified size and worn by an avatar of a specified size. Furthermore, the image may correspond to a specified view, such as a front view, side view, waist-up view, waist-down view, or the like. For example, the vendor user may select a first image file of a front view of a size-15 avatar wearing a shirt in size medium.

As described previously in connection with FIG. 6, each product record may have more than one image. Accordingly, the vendor user may repeat the process of selecting and uploading images for variations of the digital avatar. For example, the vendor user may select and upload a second image of a different view (e.g., side view), a third image of a different size avatar (e.g., a size-15.5 avatar), a fourth image of a different size shirt (e.g., a large shirt), for the product record being created or edited. It will be appreciated variations of the images are not limited sizes of the product and avatar and the perspective of the view, but may include any suitable variation for modeling the product or a group of users. For example, variations of the images may include color of the product, skin color of the user, and the like.

The element 2010 may correspond to a frame including one or more elements for receiving and displaying user input that is indicative of one or more attributes of the product and or selected image. Each entry of element 2010 may correspond to an attribute-value pair. For example, the element 2020,2022 may receive and display user input associated with an attribute name and an attribute value. The respective attributes may have a value, such as a binary logic, a numerical value, or sting value suitable for expressing the degree or nature of the attribute. For example, an attribute named "Sale" may have a value "30%" to indicate that the product of the product record is on sale for 30%. Other example attribute-value pairs may include (Color, Red), (Shirt, True), (ButtonFly, No), (OnlineOnly, Yes), and the like.

Moreover, the attribute-value pair may be indicative of the variation of the image. For example, an image corresponding to a front view of a size-15 avatar wearing a particular shirt in size medium may have entries of 2010 corresponding to (ProductSize, M), (AvatarSize, 15), and (View, Front). In this way, in response to a user of the online marketplace selecting a specified product, size, and view, the digital avatar system 500 may select the corresponding image for display.

It will be appreciated that the attributes may be global attributes or image attributes. Global attribute are attribute that are applied to each image variation of the product. An example global attribute may be (Sale, 30%), which may be applied to each image of the product. Accordingly, global attributes may facilitate searching for products that satisfy one or more search conditions. An image attribute may be an attribute that is only applied to the selected image of the product. Examples of image attributes include (ProductSize, M), (AvatarSize, 15), and (View, Front). Accordingly, image attributes may facilitate selecting an image from a plurality of images of a product for display as part of a digital avatar.

To facilitate populating the element 2010 of attributes, the user interface 2000 may include the element 2018, which may correspond to selectable button for selecting a template on file. A template includes data for automatically generating one or more attribute-value pairs of element 2010.

It will be understood by a person of ordinary skill that other embodiments of the user interfaces of FIGS. 7-20 need not include each element of shown in the figures and other embodiments may include more or less elements.

Example Digital Avatar Processes

Figure 21:
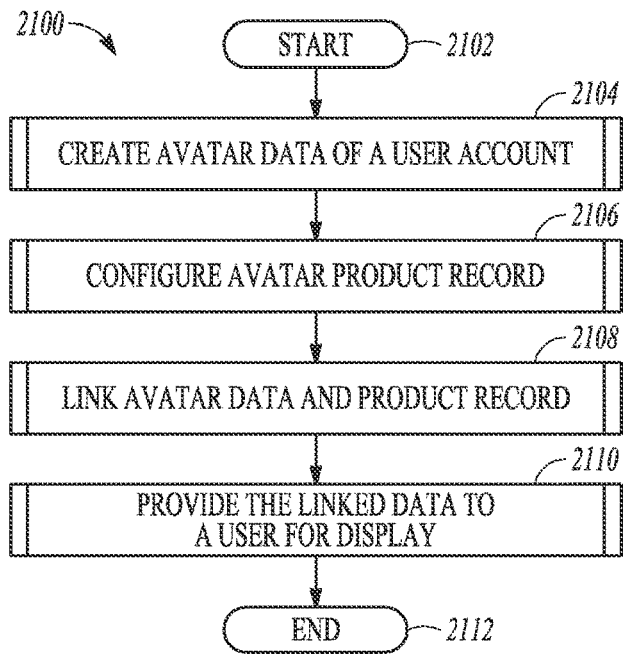
FIG. 21 is a flowchart illustrating an example method of generating avatar data for users, in accordance with an example embodiment.

FIG. 21 is a flowchart illustrating an example method 2100 of generating avatar data for users, in accordance with an example embodiment. In this example, the method 2100 may include operations such as creating avatar data of a user account 2104, configuring an avatar product record 2106, linking avatar data and a product record 2108, and providing the link data to a user for display 2110. The example method 2100 will be described, by way of explanation, below as being performed by certain modules. It will be appreciated, however, that the operations of the example method 2100 can be performed in any suitable order by any number of the modules shown in FIG. 5.

The method 2100 starts at block 2102 and proceeds to block 2104 for creating avatar data of a user account. For example, the digital avatar system 500 (e.g., via the webfront module 512) may provide data for a user interface to be displayed on a user device. The user interface may correspond to the example user interfaces described previously in connection with FIG. 7-10. Accordingly, the digital avatar system 500 may determine measurement data of the user based on one or more images provided by the user. Furthermore, the measurement data of the users may be based additionally on one or more user inputs, such as the height and/or weight of the user. The data related to the height and/or weight of the user may be inputted by the user manually via the elements 728, 730, 734 of FIG. 7.

In an example embodiment, the graphics processing module 506 may determine the measurement data based on the one or more images and, if provided, data related to the height and/or weight of the user. For example, the graphics processing module 506 may utilize the height measurement of the user to scale the distances between the POIs of the images to physical measurements. It will be appreciated, however, that in alternative embodiments, measurement data may be obtained in alternative ways, such as body scan data and/or manual user input.

The measurement data may be stored in the sizing data field 622 of the data structure 602 of FIG. 6. The received image data may be stored in the image data field 624 of the data structure 602. In an example embodiment of block 2104 will be described later in greater detail in connection with FIG. 22.

The method 2100 may include block 2106 for configuring an avatar product record. For example, a vendor user may create or modify a product record data structure 604 that is linked to the vendor account 605. In an example embodiment, the digital avatar system 500 (e.g., using the web-front module 512) may provide data to display a user interface on a client device of the vendor user. The user interface may, for instance, correspond to the user interface 2000 described previously in connection with FIG. 20. Accordingly, the digital avatar system 500 may receive one or more images and one or more attributes of the product from the user vendor. In turn, the vendor database sub-module 522 may store the received product data in the product record data structure 604. For example, the one or more images, as well as attributes of the images, may be stored in the image data array 636. Global attributes may be stored in the attributes array 634. In an example embodiment of block 2106 will be described later in greater detail in connection with FIG. 23.

The method 2100 may include the block 2108 for linking avatar data and a product record. By linking the data, model data for a digital avatar wearing the selected product may be generated for display on a user device. In an example embodiment, the digital avatar system 500 may provide data for a user interface of an online market to allow the user to view digital avatars. The user interface may correspond to the interfaces described previously connection with FIGS. 14-19. Linking avatar data of the user and a product record may be responsive to a user request to generate an avatar wearing a selected product. For example, the digital avatar system 500 may perform block 2108 in response to the user selecting, for example, the element 1506F of FIG. 16. The linking may include mapping the user's measurements to a product image of the corresponding product record. An example embodiment of block 2108 will be described later in greater detail in connection with FIG. 24.

After the linked data is generated at block 2108, the method 2100 may include block 2110 for providing the linked data to a user for display. In an example embodiment, the communication interface module 508 may provide the link data to a user device in accordance with the user request of block 2108. The user device may correspond to the requesting user or to another user (e.g., the requesting user sharing avatar data with a second user). An example embodiment of block 2110 will be described later in greater detail in connection with FIG. 26.

Figure 22:
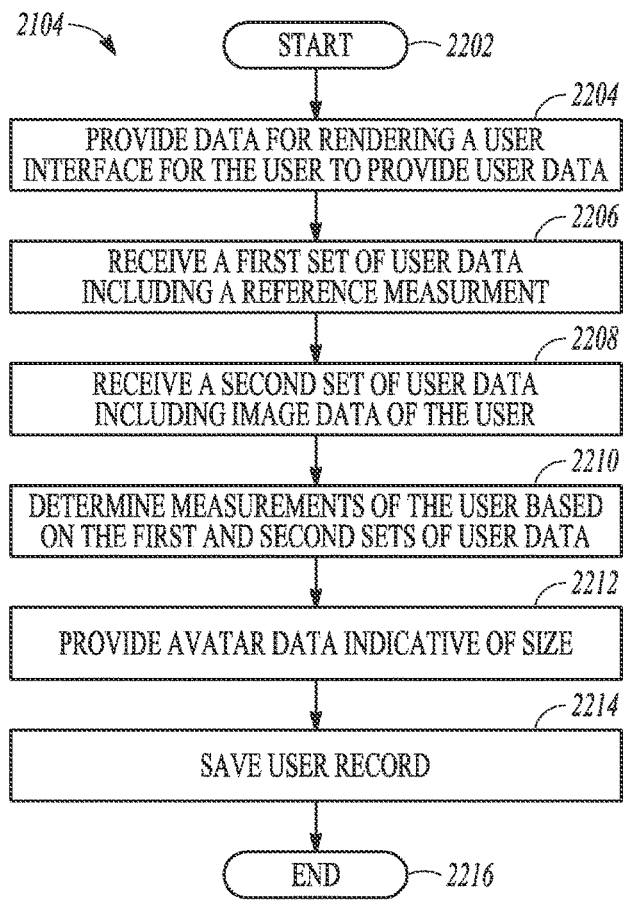
FIG. 22 is a flowchart illustrating an example method of creating avatar data, in accordance with an example embodiment.

FIG. 22 is a flowchart illustrating an example method 2104 of creating avatar data, in accordance with an example embodiment. In this example, the method 2104 may include operations such as providing data for rendering a user interface 2204, receiving a first set of user data that includes a reference measurement 2206, receiving a second set of user data including image data 2208, determining dimensions of the user based on the first and second sets of user data 2210, providing avatar data indicative of size data 2212, and saving the avatar data to a user record 2214. The example method 2104 will be described, by way of explanation, below as being performed by certain modules. It will be appreciated, however, that the operations of the example method 2104 can be performed in any suitable order by any number of the modules shown in FIG. 5.

The method 2104 starts at block 2202 and proceeds to block 2204 for providing data for rendering the user interface. In an example embodiment, the web front module 512 may provide data for a user interface to a user device via the user facing sub-module 514. The user interface may correspond to the user interfaces shown in FIG. 7-9. In particular, the user interface may include elements 712-736 of FIG. 7 for creating a user account. The user may supply user input that is indicative of the user's height and weight via the elements 728, 730, 734. Additionally or alternatively, the user interface may include elements for providing image data, such as sub-frames 802, 804, 806.

The method 2104 may further include block 2206 for receiving a first set of user data including a reference measurement. In an example embodiment, the first of the data may correspond to data provided by the user via the elements 728, 730, 734 for providing the user's height and weight. In one aspect, the user's height may be used as a reference measurement in order to determine a scale of images provided by the user, as will be described in greater detail below. Additionally or alternatively, data that is indicative of the user's height and weight may be stored in the data structure 602 of the user account (e.g., in the sizing data field 622).

The method 2106 may further include block 2208 for receiving a second set of user data that includes image data of the user. In an example embodiment, the second set of data may correspond to data provided by the user via the sub-frame elements 802, 804, 806 of FIG. 8. Moreover, a plurality of POIs elements (e.g., elements 816-826, 838-842, 858-864) may have been positioned within the respective images. In an example embodiment, the graphics processing module 506 may determine the positioning of the POI elements automatically. Additionally or alternatively, the user interface may facilitate the user positioning the point of interest elements within the images. The distances between the POIs elements and the reference measurement may be used to determine the physical measurements of the user, as will be described below in greater detail. The image data may be stored in the data structure 602 of the user account (e.g., in the image data field 624). For example, an image of the user's head and neck may be captured for superimposing onto a body model that is selected or sized based on the user's measurements.

The method 2104 may include block 2210 for determining measurements of the user based on the first and second sets of user data. In an example embodiment, the digital avatar system 500 may receive the first and second sets of data from the user device. The graphics processing module 506 may determine the one or more distances between POIs elements in terms of the image space. For example, the graphics processing module 506 may determine the distance between the top-of-the-head POI element and the foot POI element, which may measure, for example, 1 inch or 1000 pixels in the image. The measurement in the image space may be related to the reference measurement (e.g., the user's height provided at block 2206) in order to determine the scale the image relative the real-world physical measurements. For example, in the case that the user has indicated a height of 6 feet, each inch or 1000 pixels in the image space would correspond to 6 feet. Accordingly, physical measurements of the user may be estimated by scaling the distances between the POI elements in accordance with the determined scale.

In an example embodiment, the block 2210 may further include matching the measurement data to sizing data (e.g., clothing sizes). For example, the graphics processing module 506 may access a database of body measurements paired with clothing sizes. The pairings may be based on the average clothing sizes worn by people having such body measurements. Accordingly, the graphics processing module 506 may determine the clothing sizes of the user by matching the determined measurements to the measurements of the database. The graphics processing module 506 may select the clothing sizes that are paired with the stored measurements that most closely match the determined measurements of the user. Examples of the clothing sizes may include shirt sizes, pant sizes (waist, inseam, drop, etc.), shoe sizes (length, width, etc.), hat sizes (small, medium, large, diameter, etc.), glove sizes (S, M, L, etc.), and the like. It will be appreciated that clothing sizes may be in accordance with any designation or standard, such as United States standard clothing sizes, EN 13402 (European Union standard sizes), International Organization for Standardization ("ISO") 3635, ISO 4416, ISO 5971, ISO 8559, ISO/Technical Report ("TR") 10652, and the like.

Based on a determination of clothing sizes, the digital avatar system 500 may access a database of avatar body models to select a body model that closely matches the determined clothing sizes. In some embodiments, a vendor's sizing domain and avatar platform's sizing domain may be different. For example, a vendor may provide product avatar data for a set of sizes that is different from the set of sizes used by the digital avatar system 500. Accordingly, the digital avatar system 500 may include mapping data for mapping the sizes of the vendor domain to or from the sizing domain of the digital avatar system 500.

The method 2104 may include block 2212 for providing avatar data that is indicative of the size of the user. One example embodiment the communication interface module 508 may provide data that is indicative of the clothing sizes to the user device for display. Moreover, the communication interface module 508 may provide data that is usable to generate a preview digital avatar of the user. For example, the data may correspond to model data that includes image data of the user's face and image data of a digital model of the user's body. The digital model may be selected from one or more candidate model based on at least one of the determined user measurements or the determined user clothing sizes.

The method 2104 may include block 2214 for saving the user record. For example, the user database sub-module 520 of the database management module 504 may store the determined measurement data and/or the clothing sizes in the sizing data field 622 of the data structure 602.

Figure 23:
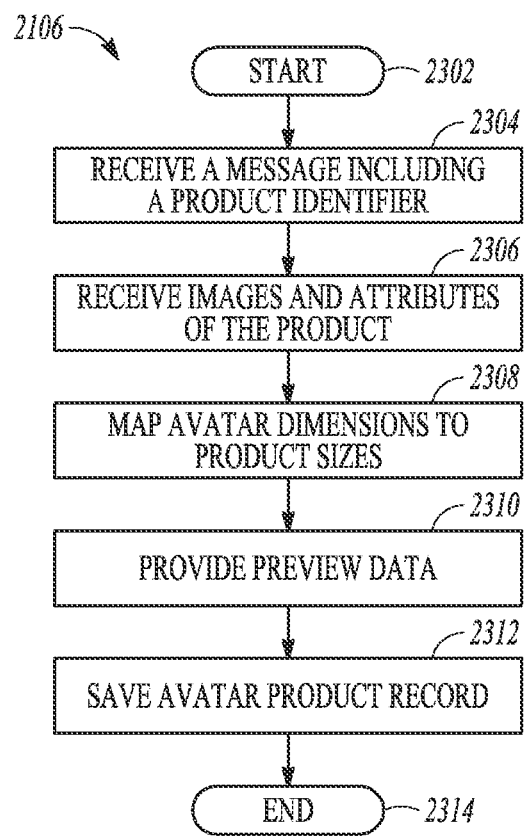
FIG. 23 is a flowchart illustrating an example method of configuring an avatar product record, in accordance with an example embodiment.

FIG. 23 is a flowchart illustrating an example method 2106 of configuring an avatar product record, in accordance with an example embodiment. In this example, the method 2106 may include operations such as receiving a message that includes a product identifier 2304, receiving images and attributes of the product 2306, mapping avatar dimensions to product sizes 2308, providing preview data 2310, and saving the avatar product records 2312. The example method 2106 will be described, by way of explanation, below as being performed by certain modules. It will be appreciated, however, that the operations of the example method 2106 can be performed in any suitable order by any number of the modules shown in FIG. 5.

The method 2106 starts at block 2302 and proceeds to block 2304 for receiving a message that includes a product identifier. For example, after a successful authentication process, the vendor-facing sub-module 516 of the application interface module 502 may receive a request to create or edit a product record from a vendor. The request may include data that is capable of identifying a product record from one or more product records linked to the vendor account. In an example embodiment, the request may be provided by the vendor to the digital avatar system 500 in response to a selection of the element 2016 for creating a product record or a selection of the element 2018 for updating the product record.

The method 2106 may include block 2306 for receiving images and attributes of the product. The images may correspond to models of the product worn by digital avatars. The model of the product may include the portion of an avatar related to or coinciding with the product. For example, a model for a shirt may be an image of the avatar from the waist up and the neck down. A model for a pair of pants may be an image of the avatar from the ankle up in the waist down. Each image may correspond to a particular variation of the users (e.g., sizes of the user, color, etc.), a particular variation of the product (e.g., sizes, color, etc.), in a particular variation of the few (e.g., front view, a side view, a back view, a waist-up view, a waist-down view, etc.). To account for the variations, a plurality of images may be provided to cover a range of variations. In operation, the database management module 504 may select the image that most closely matches a requested variation in accordance with an avatar request message.

The received attributes may include metadata that describes the product and/or images. For example, each image that is received may be accompanied by attributes data that describes the corresponding image. The attributes may be indicative of the product view, product size, product color, avatar size, avatar color, and/or the like. As such, the attributes of the images may facilitate determining which image most closely matches a requested variation of an avatar request message.

Furthermore, received attributes may include global attributes or metadata that describes the product independent of the images. For example, the attributes may designate the product as being plus sized or subject to a sale or discount. The global attributes may facilitate filtering search results. As stated, and the attributes may be provided by the vendor via the elements 2020-2026 of the user interface 2000.

The method 2106 may include block 2308 for mapping avatar dimensions to product sizes. As stated, images may be received that correspond to a respective product size. Furthermore, the images may correspond to a particular sized avatar wearing the product of a particular size. Accordingly, dimensions of digital avatars are mapped to the received images. In one example embodiment, the database management module 504 may perform the mapping of the product record using the product database sub-module 526.

The method 2106 may include block 2310 for providing preview data. In an example embodiment, the graphics processing module 506 of the digital avatar system 500 may provide a preview image to the vendor to provide visual feedback. The vendor may adjust the attributes of the product or the image in order to adjust the preview image.

The method 2106 may include block 2312 for saving the avatar product record. For example, in an example embodiment, the product database sub-module 526 may save the attributes and image data and the corresponding attributes array 634 and/or image data array 636 of the data structure 604. The method 2106 may end at block 2314.

Figure 24:
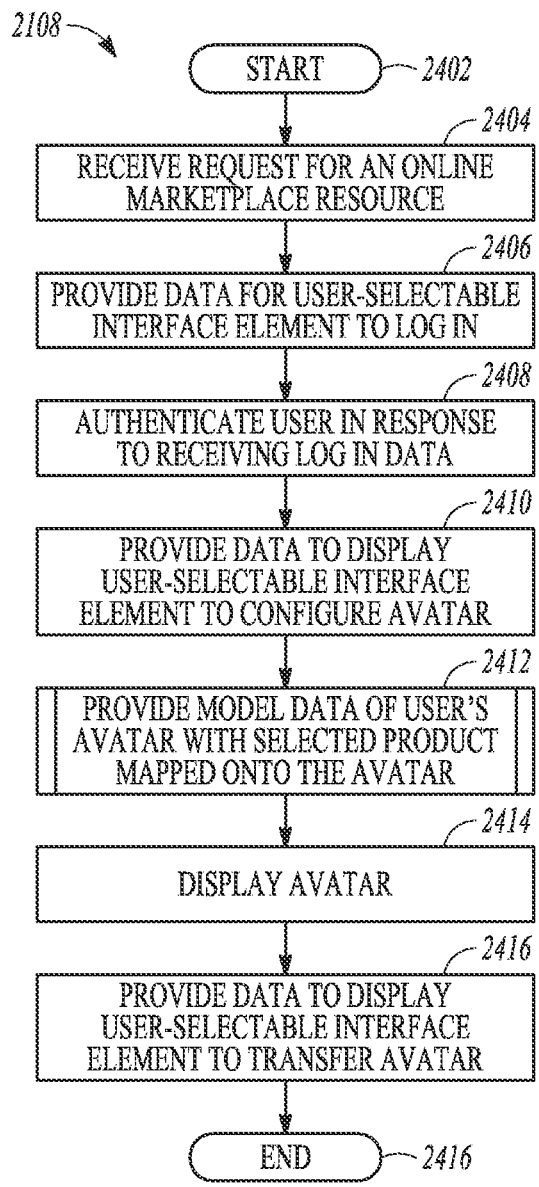
FIG. 24 is a flowchart illustrating an example method of linking avatar data, in accordance with an example embodiment.

FIG. 24 is a flowchart illustrating an example method 2108 of linking avatar data, in accordance with an example embodiment. In this example, the method 2108 may include operations such as receiving a request for an online marketplace resource 2404, providing data for user selectable interface elements for login 2406, authenticating the user 2408, providing data to display user selectable interface elements to configure the avatar display 2410, providing model data of the user's avatar 2412, displaying the avatar 2414, and providing data to display user selectable interface elements to transfer the avatar 2416. The example method 2106 will be described, by way of explanation, below as being performed by certain modules. It will be appreciated, however, that the operations of the example method. 2108 can be performed in any suitable order by any number of the modules shown in FIG. 5.

The method 2108 starts at block 2402 and proceeds to block 2404 for receiving a request for an online marketplace resource. The request may be initiated by a user device requesting data for a webpage or application displaying a user interface of an online marketplace. In an example embodiment, a user device 110 of FIG. 1 may transmit the request to the marketplace application 120. In response, the marketplace application 120 may transmit online marketplace resources to the user device 110 for display.

At block 2406, the method 2108 may include providing data for user selectable interface element for logging into the digital avatar system 500. By logging in, digital avatar user interface elements may be exposed on the user interface so that the user may request digital avatar services. In an example embodiment, the user selectable interface elements may correspond to element 1406, which when selected may prompt the user to provide username and password information.

At block 2408, the method 2108 may include authenticating the user. In an example embodiment, the application interface module 502 may receive login data from the user in connection with the user selectable interface element of block 2406. The login data may be passed to the authentication module 510 for authenticating the user. The digital avatar system 500 may provide digital avatar services in response to a successful authentication.

At block 2410, the method 2108 may include providing data to display user selectable interface elements for configuring an avatar display. For instance, user selectable interface element may be provided for products that support the digital avatar system (e.g., the product has a corresponding avatar product record data structure 604). In an example embodiment, the user selectable interface elements may correspond to elements 1506A-F as shown in FIG. 15. As stated, the elements 1506A-F may facilitate configuring the user's avatar to display selected products.

At block 2412, the method 2108 may include providing model data of the user's avatar with a selected product mapped onto the avatar. For example, the providing of the model data may be in response to a user selection of one of the user selectable interface elements of block 2410. In an embodiment, the application interface module 502 may receive an indication of the selection and access avatar data via the database management module 504. The digital avatar system 500 may provide, to the user, the model data for display will using the application interface module 502 and the communication interface module 508. Block 2412 will be described in greater detail later in connection with FIG. 25.

At block 2414, the method 2108 may include displaying the user's avatar configured with the selected product based on the model data provided at block 2412. At block 2416, the method 2108 may include providing data to display a user selectable interface elements transfer the avatar to a second user. In an example embodiment, the user selectable interface element may correspond to the element 1508 of FIG. 15. At block 2418, the method 2108 may end.

Figure 25:
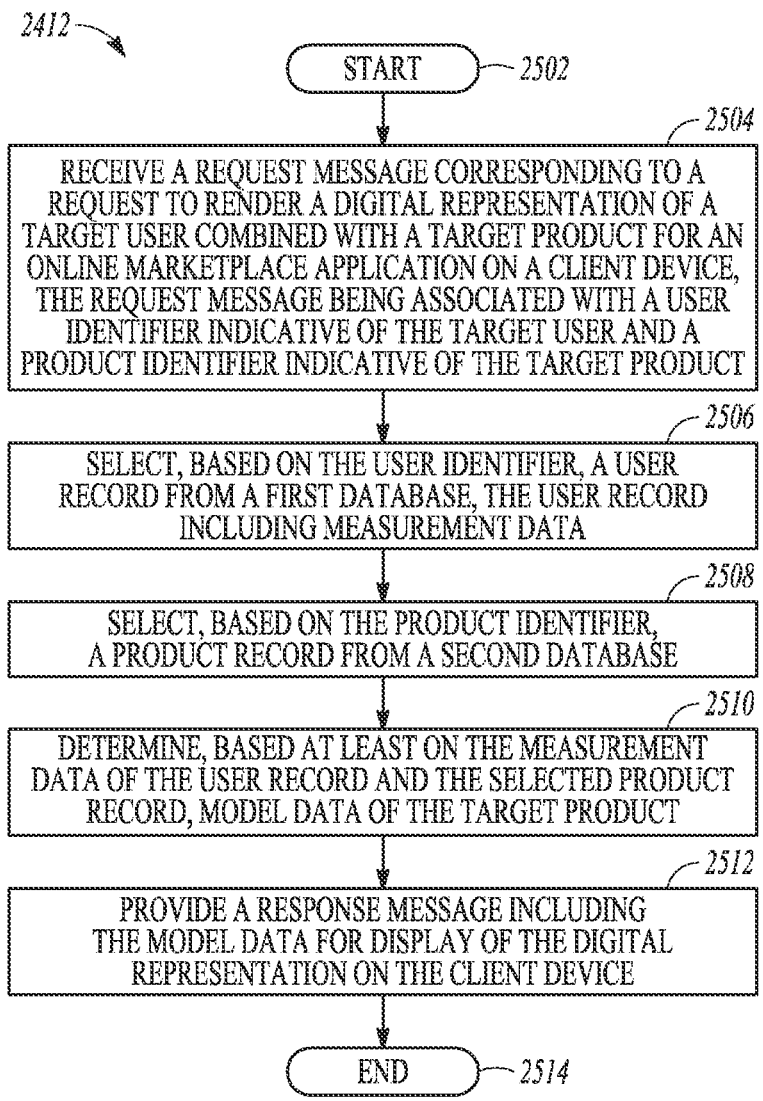
FIG. 25 is a flowchart illustrating an example method of proving model data of a user's avatar with a product, in accordance with an example embodiment.

FIG. 25 is a flowchart illustrating an example method 2412 of providing model data of a user's avatar with a product, in accordance with an example embodiment. In this example, the method 2412 may include operations such as receiving a request message 2504, selecting a user record that includes measurement data 2506, selecting a product record 2508, determining model data of the target product 2510, and providing a response message 2512. The example method 2412 will be described, by way of explanation, below as being performed by certain modules. It will be appreciated, however, that the operations of the example method 2412 can be performed in any suitable order by any number of the modules shown in FIG. 5.

The method 2412 starts at block 2502 and proceeds to block 2504 for receiving a request message corresponding to a request to render a digital representation of a target user combined with a target product. The digital representation may correspond to a digital avatar of the target user wearing the target product, which may be an article of clothing, an accessory (shoes, hats, glasses, watches, scarves, belts, bags, etc.), wearable devices (headphones, wearable computing devices, etc.), or the like.

The user of the client device may provide the request message to configure the user's avatar or another user's avatar. Accordingly, the target user may be different from the user of the client device. An example of a user interface for configuring the user's avatar is shown in FIG. 16. An example of a user interface for configuring another user's avatar is shown in FIG. 18.

In an example embodiment, the application interface module 502 may receive the request message from a user device or from an online marketplace application. The request message may be associated with a user identifier that is indicative of the target user. The first request message may also be associated with a product identifier that is indicative of the target product. For example, the request message may include the user identifier and the product identifier as a data packet. Alternatively, the user identifier and the product identifier may be transmitted to the digital avatar system 500 separately from the request message.

At blocks 2506, 2508, the method 2412 may include selecting a user account (or also referred to as a "record") and a product record from databases. The selection of the user account may be based on the user identifier associated with the request message. For example, the database management module 504 may compare the user identifier associated with the request message to a user identifier of a user account. In accordance with a determination of a match, the database management module 504 may select the user account. In an example embodiment, the user account may correspond to the data structure 602 of FIG. 6. As such, the user account may include the measurement data in the sizing data field 622.

The selection of the product record may be based on the product identifier associated with the request message received at block 2504. For example, the database management module 504 may compare the product identifier associated with the request message to a product identifier of a product record. In accordance with a determination of a match, the database management module 504 may select the product record. In an example embodiment, the product record may correspond to the data structure 604 of FIG. 6. As such, the product record may include the one or more images in the image data array 636.

At block 2510, the method 2412 may include determining model data of the target product. Model data may correspond to image data for generating an digital avatar that is configured with the target product. The model data may include user model data and product model data that may be combined to generate the configured avatar. The user model data may correspond to an image of the user's face, which may be superimposed on an avatar body. The product model data may be representative of an image of a portion of model avatar that coincides with the product. For example, if the target product is a shirt, the product model data may correspond to an image of a torso region of a model avatar wearing the target shirt.

As such, the product model data may be determined based on attributes of the target product and the target user. In particular, the determining of the product model data may be based at least on the measurement data of the user record and the selected product record. In operation, in an example embodiment, the database management module 504 may select an element 638 of the image data array 636 in accordance with attributes of the target user and the target product. For example, each element of the image data array 636 may correspond to a specified user measurement and a product size. Accordingly, the database management module 504 may select the element of the image data array 636 that provides the closest match to the target user's measurements and the target product's size. It will be appreciated that the element 638 of the image data array 636 may be selected based on more or less attributes. For example, the element 638 may be selected based on the skin color or palette of the target user, the color of the target product, and/or the like variations of the target user or target product.

Furthermore, the element 638 may include one or more views of the selected variation of the product. Accordingly, the request message may include data that is indicative of a selected view, and the database management module 504 may select an image of the view data 642-646 based on the view indicated by the request message. As a result, the selected image may serve as the product model data.

At block 2512, the method 2412 may include providing a response message that includes the model data for display on the client device. In an example embodiment, the application interface module 502 may transmit the model data to a user device using the communication interface module 508. At block 2514, the method 2412 may end.

Figure 26:
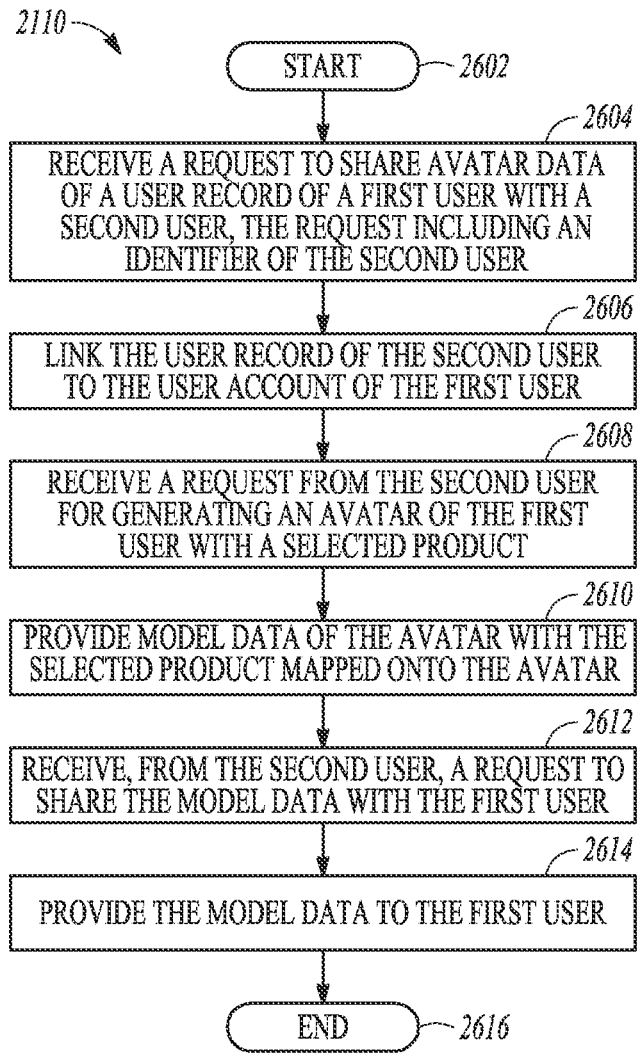
FIG. 26 is a flowchart illustrating an example method of providing avatar data to users, in accordance with an example embodiment.

FIG. 26 is a flowchart illustrating an example method 2110 of sharing avatar data, in accordance with an example embodiment. In this example, the method 2110 may include operations such as receiving a request to share avatar data 2604, linking a user record to the avatar data 2606, receiving a request for generating an avatar 2608, providing model data of the avatar 2610, receiving a request to share the model data 2612, and providing the model data 2614. The example method 2110 will be described, by way of explanation, below as being performed by certain modules. It will be appreciated, however, that the operations of the example method 2110 can be performed in any suitable order by any number of the modules shown in FIG. 5.

The method 2110 starts at block 2602 and proceeds to block 2604 for receiving a request to share avatar data of a user record. For example, the application interface module 502 may receive the request from a first user for sharing avatar data of the first user with a second user. To this end, the request may be associated with an identifier of a second user. In an example embodiment, the request may correspond to a data packet that includes the identifier of the second user.

At block 2606, the method 2110 may include linking the user record of the second user to the user account of the first user. An example embodiment, the database management module may provide linking data to the second user record. The linking data may facilitate providing the second user access to the avatar data of the first user record. For example, the linking data may be indicative of a location of the user record for accessing the avatar data. Additionally or alternatively, the database management module 504 may write data to the user record of the first user that is indicative of access privileges for the second user.

At block 2608, the method 2110 may include receiving a request from the second user for generating avatar of the first user with a selected product 2608. The operation of block 2608 may correspond to method 2412 of FIGS. 24 and 25.

At block 2610, the method 2110 may include providing model data of the avatar with the selected product mapped onto the avatar. In an example embodiment, the application interface module 502 may provide the model data to the second user by using the communication interface module 508.

At block 2612, the method 2110 may include receiving, from the second user, a request to share the model data with the first user. For example, the second user may provide the request to share the avatar generated using the model data provided at block 2610. As such, the user may select the element 1508 of the user interface 1500 of FIG. 15. The application interface module 502 of the digital avatar system 500 may receive an indication of the user's selection.

At block 2614, the method 2110 may include providing the model data to the first user. The providing of the model data may be responsive to receiving an indication of a request to share and avatar, in an example embodiment, the digital avatar system 500 may provide the first user the model data that was provided to the second user at block 2610.

An example embodiment, products displayed on a digital avatar may be selectable for navigating a user interface to a product page of the selected product. For example, the second user may dress the avatar of the first user with a shirt and may send the avatar to the first user. In turn, the first user may select the shirt on the avatar display to bring up a webpage of the shirt. On this webpage, the user may purchase the shirt. Moreover, the model data may include data for tracking purchases made by the first user. Accordingly, in response to the first user purchasing a product included with the avatar, the second user may receive a reward, such as points, discount, free merchandise, or the like. At block 2616, the method 2110 may end.

The example methods 2100, 2104, 2106, 2108, 2412, 2110 were described, by way of explanation, above as utilizing certain data structures. It will be appreciated, however, that the data accessed or stored by the example methods can be stored in any suitable data structure, including, but not limited to, the data structures shown in FIG. 6.

Modules, Components and Logic

Certain embodiments are described herein as including logic or a number of components, modules, or mechanisms. Modules may constitute either software modules (e.g., code embodied (1) on anon-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 27:
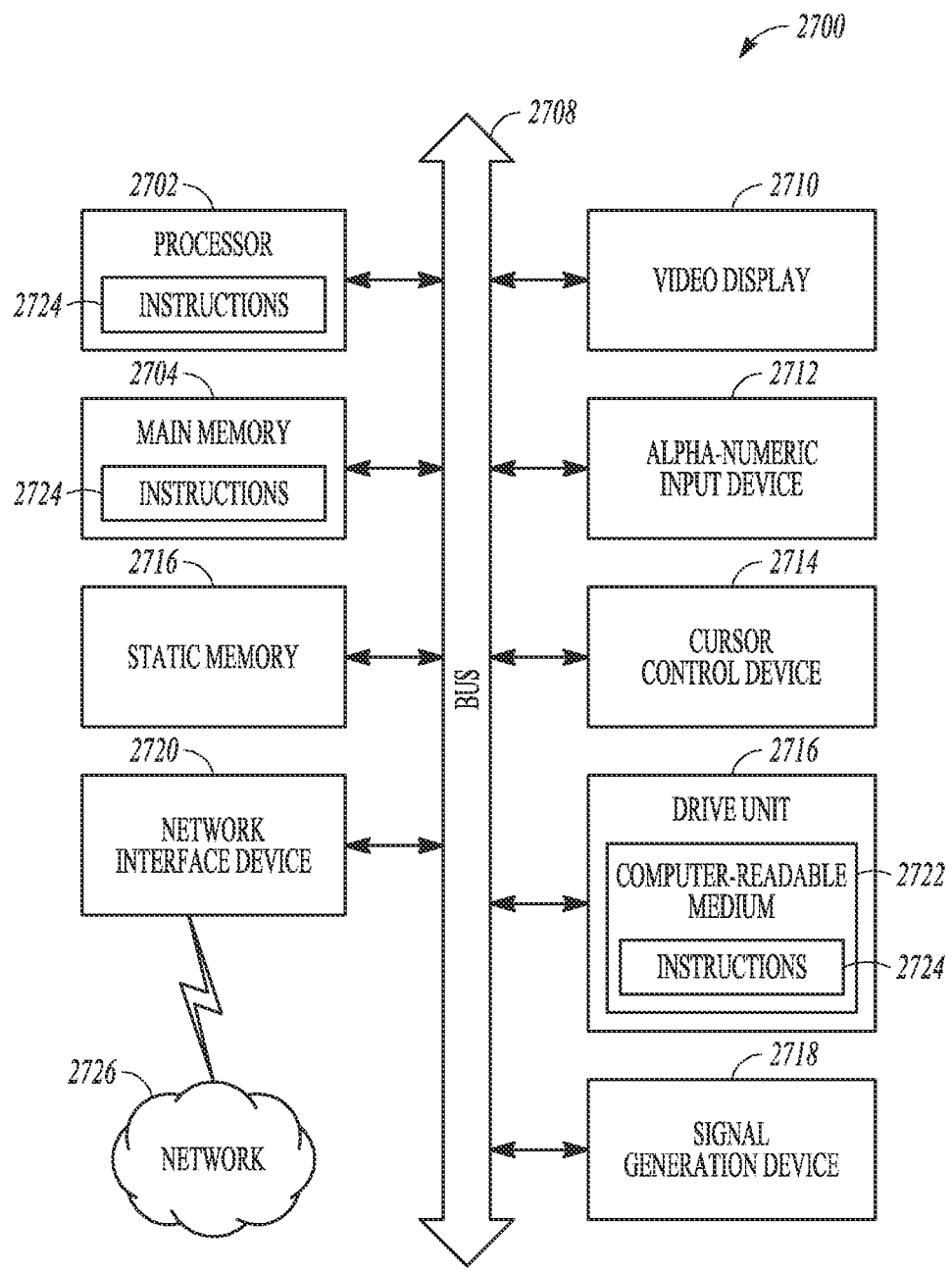
FIG. 27 is a block diagram of machine in the example form of a computer system within which instructions, for causing the machine to perform any one or more of the methodologies discussed herein, may be executed.

FIG. 27 is a block diagram of machine in the example form of a computer system 2700 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2700 includes a processor 2702 (e.g., a central processing unit (CPU), a graphics processing unit (GPU) or both), a main memory 2704 and a static memory 2706, which communicate with each other via a bus 2708. The computer system 2700 may further include a video display unit 2710 (e.g., a liquid crystal display (LCD) or a cathode ray tube (CRT)). The computer system 2700 also includes an alphanumeric input device 2712 (e.g., a keyboard or a touch-sensitive display screen), a user interface (UI) navigation device 2714 (e.g., a mouse), a disk drive unit 2716, a signal generation device 2718 (e.g., a speaker) and a network interface device 2720.

Machine-Readable Medium

The disk drive unit 2716 includes a machine-readable medium 2722 on which is stored one or more sets of instructions and data structures (e.g., software) 2724 embodying or utilized by any one or more of the methodologies or functions described herein. The instructions 2724 may also reside, completely or at least partially, within the main memory 2704 and/or within the processor 2702 during execution thereof by the computer system 2700, the main memory 2704 and the processor 2702 also constituting machine-readable media.

While the machine-readable medium 2722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any non-transitory, tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 2724 may further be transmitted or received over a communications network 2726 using a transmission medium. The instructions 2724 may be transmitted using the network interface device 2720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed:

1. A system comprising:
   one or more hardware processors; and
   a non-transitory machine-readable medium for storing instructions that, when executed by one or more hardware processors, cause the one or more hardware processors to perform operations comprising:
   receiving a first request message corresponding to a request to render a digital representation of a first target user combined with a target product for an online marketplace application on a first client device, the first request message being associated with a first user identifier indicative of the first target user and a product identifier indicative of the target product;
   causing display of one or more templates that identify one or more poses of a model user in a user interface of the first client device;
   receiving one or more images of the first target user corresponding to the one or more templates from the first client device, the one or more images of the first target user illustrating an actual shape of the first target user displayed in poses corresponding to the one or more poses of the model user included in the one or more templates;

causing display of the one or more images of the first target user in the user interface of the first client device;

based on matching a pose in the one or more images of the first target user and the one or more poses included in the one or more templates, automatically superimposing the matched template on the matched image of the first target user, the matched template being selectable to adjust from a template shape of the model user to the actual shape of the first target user as displayed in the one or more images of the first target user;

determining one or more measurements of the first target user based on an adjustment of the matched template in the user interface to the actual shape of the first target user via a selection and movement of one or more portions of the matched template to match the actual shape of the first target user as displayed in the one or more images of the first target user in the user interface;

generating and causing a rendering of a digital representation of the first target user in the user interface of the first client device based on the one or more measurements of the first target user;

identifying, based on the one or more measurements of the first target user and based on the product identifier, model data of the target product;

in response to the first request message, providing a response message including the model data of the target product to the first client device; and based on the response message, causing a rendering of the digital representation of the first target user combined with the target product in the user interface on the first client device using the model data of the target product and the rendering of the digital representation of the first target user.

2. The system of claim 1, wherein the digital representation corresponds to a digital avatar of the first target user wearing the target product, the target product corresponding to at least one of an article of clothing or a fashion accessory.

3. The system of claim 1, wherein the operations further comprise:
receiving a share request message corresponding to a request to share data in a first user record associated with the first target user with a second user record; and
providing linking data to the second user record, the linking data indicative of access privileges of the first user record for a user associated with the second user record.

4. The system of claim 1, wherein the operations further comprise:
receiving a share request message including a first identifier indicative of a first user record associated with the first target user, and a second identifier indicative of a second user record, the share request message corresponding to a request to share data in the first user record with a user of the second user record;
accessing, based on the second identifier, the second user record from a first database; and
writing linking data to the accessed second user record, the linking data providing access privileges to the first user record.

5. The system of claim 4, wherein the first user record includes at least one of image data of the first target user, or the model data of the target product.

6. The system of claim 1, wherein the first target user is different from a user of the first client device.

7. The system of claim 1, wherein the operations further comprise:

receiving a second request message corresponding to a request to modify the digital representation to further include a second target user combined with a second target product, the request message being associated with a second user identifier indicative of the second target user and a second product identifier indicative of the second target product;

selecting, based on the second user identifier, a second user record from a first database, the second user record including measurement data of the second target user;

selecting, based on the second product identifier, a second product record from a second database;

determining, based at least on the measurement data of the second user record and the selected second product record, second model data of the second target product; and in response to the second request message, providing a second response message including the second model data for display of the digital representation on the first client device.

8. The system of claim 1, wherein the operations further comprise:
receiving the first request message from a second client device, the first and second client devices being different client devices.

9. The system of claim 1, wherein the operations further comprise:
receiving an authentication request message for authentication of the first client device;
determining, based on the authentication request message, that the first client device passes authentication; and
causing display of a user interface element for receiving a request to share data in a first user record associated with the first target user with a second user record.

10. The system of claim 1, wherein the product identifier is stored in a product record in a second database, and wherein the operations further comprise:
receiving product data from an online marketplace client device; and
updating, based on the product data, the second database.

11. A computer-implemented method comprising:
receiving a first request message corresponding to a request to render a digital representation of a first target user combined with a target product for an online marketplace application on a first client device, the first request message being associated with a first user identifier indicative of the first target user and a product identifier indicative of the target product;

causing display of one or more templates that identify one or more poses of a model user in a user interface of the first client device;

receiving one or more images of the first target user corresponding to the one or more templates from the first client device, the one or more images of the first target user illustrating an actual shape of the first target user displayed in poses corresponding to the one or more poses of the model user included in the one or more templates;

causing display of the one or more images of the first target user in the user interface of the first client device;

based on matching a pose in the one or more images of the first target user and the one or more poses included in the one or more templates, automatically superimposing the matched template on the matched image of the first target user, the matched template being selectable to adjust from a template shape of the model user to the actual shape of the first target user as displayed in the one or more images of the first target user;

determining one or more measurements of the first target user based on an adjustment of the matched template in the user interface to the actual shape of the first target user via a selection and movement of one or more portions of the matched template to match the actual shape of the first target user as displayed in the one or more images of the first target user in the user interface;

generating and causing a rendering of a digital representation of the first target user in the user interface of the first client device based on the one or more measurements of the first target user;

identifying, based on the one or more measurements of the first target user and based on the product identifier, model data of the target product, the identifying being performed by one or more hardware processors;

in response to the first request message, providing a response message including the model data of the target product to the first client device; and based on the response message, causing a rendering of the digital representation of the first target user combined with the target product in the user interface on the first client device using the model data of the target product and the rendering of the digital representation of the first target user.

12. The computer-implemented method of claim 11, wherein the digital representation corresponds to a digital avatar of the first target user wearing the target product, the target product corresponding to at least one of an article of clothing or a fashion accessory.

13. The computer-implemented method of claim 11, further comprising:

receiving a share request message corresponding to a request to share data in a first user record with a second user record; and providing linking data to the second user record, the linking data indicative of access privileges of the first user record for a user associated with the second user record.

14. The computer-implemented method of claim 11, further comprising:

receiving a share request message including a first identifier indicative of a first user record and a second identifier indicative of a second user record, the share request message corresponding to a request to share data in the first user record with a user of the second user record; and accessing, based on the second identifier, the second user record from a first database; and writing linking data to the accessed second user record, the linking data providing access privileges to the first user record.

15. The computer-implemented method of claim 14, wherein the first user record includes at least one of image data of the first target user, or the model data of the target product.

16. A non-transitory machine-readable medium for storing instructions that, when executed by one or more hardware processors of a machine, cause the machine to perform operations comprising:

receiving a first request message corresponding to a request to render a digital representation of a first target user combined with a target product for an online marketplace application on a first client device, the first request message being associated with a first user identifier indicative of the first target user and a product identifier indicative of the target product;

causing display of one or more templates that identify one or more poses of a model user in a user interface of the first client device;

receiving one or more images of the first target user corresponding to the one or more templates from the first client device, the one or more images of the first target user illustrating an actual shape of the first target user displayed in poses corresponding to the one or more poses of the model user included in the one or more templates;

causing display of the one or more images of the first target user in the user interface of the first client device;

based on matching a pose in the one or more images of the first target user and the one or more poses included in the one or more templates, automatically superimposing the matched template on the matched image of the first target user, the matched template being selectable to adjust from a template shape of the model user to the actual shape of the first target user as displayed in the one or more images of the first target user;

determining one or more measurements of the first target user based on an adjustment of the matched template in the user interface to the actual shape of the first target user via a selection and movement of one or more portions of the matched template to match the actual shape of the first target user as displayed in the one or more images of the first target user in the user interface;

generating and causing a rendering of a digital representation of the first target user in the user interface of the first client device based on the one or more measurements of the first target user;

identifying, based on the one or more measurements of the first target user and based on the product identifier, model data of the target product;

in response to the first request message, providing a response message including the model data of the target product to the first client device; and based on the response message, causing a rendering of the digital representation of the first target user combined with the target product in the user interface on the first client device using the model data of the target product and the rendering of the digital representation of the first target user.

17. The non-transitory machine-readable medium of claim 16, wherein the digital representation corresponds to a digital avatar of the first target user wearing the target product, the target product corresponding to at least one of an article of clothing or a fashion accessory.

18. The non-transitory machine-readable medium of claim 16, wherein the operations further comprise:

receiving a share request message corresponding to a request to share data in a first user record with a second user record; and providing linking data to the second user record, the linking data indicative of access privileges of the first user record for a user associated with the second user record.

19. The non-transitory machine-readable medium of claim 16, wherein the operations further comprise:

receiving a share request message including a first identifier indicative of a first user record and a second identifier indicative of a second user record, the share request message corresponding to a request to share data in the first user record with a user of the second user record;

accessing, based on the second identifier, the second user record from a first database; and writing linking data to the accessed second user record, the linking data providing access privileges to the first user record.

20. The non-transitory machine-readable medium of claim 19, wherein the first user record includes at least one of image data of the first target user, or the model data of the target product.

\* \* \* \* \*